US010896472B1

(12) United States Patent
Stack et al.

(10) Patent No.: US 10,896,472 B1
(45) Date of Patent: Jan. 19, 2021

(54) SECURITY AND IDENTITY VERIFICATION SYSTEM AND ARCHITECTURE

(71) Applicant: CSIdentity Corporation, Austin, TX (US)

(72) Inventors: Brian Stack, San Clemente, CA (US); Iris Connealy-Seri, Belmont, MA (US); Neli Coleman, Alexandria, VA (US); Omar Salam, Irvine, CA (US); Adam Kennedy, Austin, TX (US)

(73) Assignee: CSIDENTITY CORPORATION, Austin, TX (US)

( * ) Notice: Subject to any disclaimer, the term of this patent is extended or adjusted under 35 U.S.C. 154(b) by 0 days.

(21) Appl. No.: 16/189,990

(22) Filed: Nov. 13, 2018

Related U.S. Application Data

(60) Provisional application No. 62/586,014, filed on Nov. 14, 2017.

(51) Int. Cl.
*G06Q 40/00* (2012.01)
*G06Q 50/26* (2012.01)
(Continued)

(52) U.S. Cl.
CPC ....... *G06Q 40/123* (2013.12); *G06F 21/6245* (2013.01); *G06Q 10/0635* (2013.01);
(Continued)

(58) Field of Classification Search
None
See application file for complete search history.

(56) References Cited

U.S. PATENT DOCUMENTS

| 2,074,513 A | 3/1937 | Mills |
| 3,316,395 A | 4/1967 | Lavin et al. |

(Continued)

FOREIGN PATENT DOCUMENTS

| CN | 104877993 | 9/2015 |
| DE | 91 08 341 | 10/1991 |

(Continued)

OTHER PUBLICATIONS

"The Return Review Program Increases Fraud Detection; However, Full Retirement of the Electronic Fraud Detection System Will Be Delayed", Treasury Inspector General for Tax Administration (Year: 2017).*

(Continued)

*Primary Examiner* — Bruce I Ebersman
*Assistant Examiner* — Brock E Turk
(74) *Attorney, Agent, or Firm* — Knobbe, Martens, Olson & Bear, LLP

(57) ABSTRACT

Embodiments of a security and identity verification system are disclosed. The security and identity verification system may comprise a system that conducts automated identify verification of tax filers and generates electronic alerts to send to tax filers upon filing of a tax form with a tax service provider. The tax fraud alert system may also provide remediation services in coordination with tax service providers in the event a fraudulent form is filed; and/or validate tax identity information and the corresponding good or best tax filer contact information in order to notify the tax filer in a timely manner.

18 Claims, 14 Drawing Sheets

(51) Int. Cl.
*G06Q 10/06* (2012.01)
*H04L 29/06* (2006.01)
*G06F 21/62* (2013.01)
*H04L 29/08* (2006.01)

(52) U.S. Cl.
CPC ....... *G06Q 50/265* (2013.01); *H04L 63/0428* (2013.01); *H04L 67/306* (2013.01)

(56) References Cited

U.S. PATENT DOCUMENTS

| | | |
|---|---|---|
| 3,752,904 A | 8/1973 | Waterbury |
| 4,163,290 A | 7/1979 | Sutherlin et al. |
| 5,274,547 A | 12/1993 | Zoffel et al. |
| 5,323,315 A | 6/1994 | Highbloom |
| 5,414,833 A | 5/1995 | Hershey et al. |
| 5,454,030 A | 9/1995 | de Oliveira et al. |
| 5,504,675 A | 4/1996 | Cragun et al. |
| 5,563,783 A | 10/1996 | Stolfo et al. |
| 5,627,886 A | 5/1997 | Bowman |
| 5,679,940 A | 10/1997 | Templeton et al. |
| 5,696,907 A | 12/1997 | Tom |
| 5,696,965 A | 12/1997 | Dedrick |
| 5,739,512 A | 4/1998 | Tognazzini |
| 5,742,775 A | 4/1998 | King |
| 5,745,654 A | 4/1998 | Titan |
| 5,752,242 A | 5/1998 | Havens |
| 5,754,632 A | 5/1998 | Smith |
| 5,774,868 A | 6/1998 | Cragun et al. |
| 5,809,478 A | 9/1998 | Greco et al. |
| 5,819,226 A | 10/1998 | Gopinathan et al. |
| 5,819,260 A | 10/1998 | Lu et al. |
| 5,822,741 A | 10/1998 | Fischthal |
| 5,832,068 A | 11/1998 | Smith |
| 5,842,178 A | 11/1998 | Giovannoli |
| 5,870,721 A | 2/1999 | Norris |
| 5,872,921 A | 2/1999 | Zahariev et al. |
| 5,878,403 A | 3/1999 | DeFrancesco |
| 5,879,297 A | 3/1999 | Haynor et al. |
| 5,884,289 A | 3/1999 | Anderson et al. |
| 5,912,839 A | 6/1999 | Ovshinsky et al. |
| 5,913,196 A | 6/1999 | Talmor et al. |
| 5,943,666 A | 8/1999 | Kleewein et al. |
| 5,950,179 A | 9/1999 | Buchanan et al. |
| 5,987,440 A | 11/1999 | O'Neil et al. |
| 5,999,907 A | 12/1999 | Donner |
| 5,999,940 A | 12/1999 | Ranger |
| 6,023,694 A | 2/2000 | Kouchi et al. |
| 6,029,139 A | 2/2000 | Cunningham et al. |
| 6,029,149 A | 2/2000 | Dykstra et al. |
| 6,029,154 A | 2/2000 | Pettitt |
| 6,029,194 A | 2/2000 | Tilt |
| 6,044,357 A | 3/2000 | Garg |
| 6,055,570 A | 4/2000 | Nielsen |
| 6,094,643 A | 7/2000 | Anderson et al. |
| 6,119,103 A | 9/2000 | Basch et al. |
| 6,125,985 A | 10/2000 | Amdahl et al. |
| 6,142,283 A | 11/2000 | Amdahl et al. |
| 6,144,988 A | 11/2000 | Kappel |
| 6,157,707 A | 12/2000 | Baulier et al. |
| 6,182,219 B1 | 1/2001 | Feldbau et al. |
| 6,208,720 B1 | 3/2001 | Curtis et al. |
| 6,249,228 B1 | 6/2001 | Shirk et al. |
| 6,253,203 B1 | 6/2001 | O'Flaherty et al. |
| 6,254,000 B1 | 7/2001 | Degen et al. |
| 6,263,447 B1 | 7/2001 | French et al. |
| 6,269,349 B1 | 7/2001 | Aieta et al. |
| 6,282,658 B2 | 8/2001 | French et al. |
| 6,285,983 B1 | 9/2001 | Jenkins |
| 6,285,987 B1 | 9/2001 | Roth et al. |
| 6,292,795 B1 | 9/2001 | Peters et al. |
| 6,311,169 B2 | 10/2001 | Duhon |
| 6,317,783 B1 | 11/2001 | Freishtat et al. |
| 6,321,339 B1 | 11/2001 | French et al. |
| 6,330,546 B1 | 12/2001 | Gopinathan et al. |
| 6,397,197 B1 | 5/2002 | Gindlesperger |
| 6,418,436 B1 | 7/2002 | Degen et al. |
| 6,424,956 B1 | 7/2002 | Werbos |
| 6,448,889 B1 | 9/2002 | Hudson |
| 6,456,984 B1 | 9/2002 | Demoff et al. |
| 6,496,936 B1 | 12/2002 | French et al. |
| 6,505,193 B1 | 1/2003 | Musgrave et al. |
| 6,510,415 B1 | 1/2003 | Talmor et al. |
| 6,513,018 B1 | 1/2003 | Culhane |
| 6,532,459 B1 | 3/2003 | Berson |
| 6,542,894 B1 | 4/2003 | Lee et al. |
| 6,543,683 B2 | 4/2003 | Hoffman |
| 6,553,495 B1 | 4/2003 | Johansson et al. |
| 6,571,334 B1 | 5/2003 | Feldbau et al. |
| 6,597,775 B2 | 7/2003 | Lawyer et al. |
| 6,612,488 B2 | 9/2003 | Suzuki |
| 6,615,193 B1 | 9/2003 | Kingdon et al. |
| 6,658,393 B1 | 12/2003 | Basch et al. |
| 6,700,220 B2 | 3/2004 | Bayeur et al. |
| 6,714,918 B2 | 3/2004 | Hillmer et al. |
| 6,735,572 B2 | 5/2004 | Landesmann |
| 6,740,875 B1 | 5/2004 | Ishikawa et al. |
| 6,748,426 B1 | 6/2004 | Shaffer et al. |
| 6,751,626 B2 | 6/2004 | Brown et al. |
| 6,796,497 B2 | 9/2004 | Benkert et al. |
| 6,811,082 B2 | 11/2004 | Wong |
| 6,829,711 B1 | 12/2004 | Kwok et al. |
| 6,850,606 B2 | 2/2005 | Lawyer et al. |
| 6,857,073 B2 | 2/2005 | French et al. |
| 6,866,586 B2 | 3/2005 | Oberberger et al. |
| 6,871,287 B1 | 3/2005 | Ellingson |
| 6,873,979 B2 | 3/2005 | Fishman et al. |
| 6,898,574 B1 | 5/2005 | Regan |
| 6,907,408 B2 | 6/2005 | Angel |
| 6,908,030 B2 | 6/2005 | Rajasekaran et al. |
| 6,913,194 B2 | 7/2005 | Suzuki |
| 6,918,038 B1 | 7/2005 | Smith et al. |
| 6,920,435 B2 | 7/2005 | Hoffman et al. |
| 6,928,546 B1 | 8/2005 | Nanavati et al. |
| 6,930,707 B2 | 8/2005 | Bates et al. |
| 6,934,849 B2 | 8/2005 | Kramer et al. |
| 6,934,858 B2 | 8/2005 | Woodhill |
| 6,965,881 B1 | 11/2005 | Brickell et al. |
| 6,965,997 B2 | 11/2005 | Dutta |
| 6,973,462 B2 | 12/2005 | Dattero et al. |
| 6,973,575 B2 | 12/2005 | Arnold |
| 6,983,381 B2 | 1/2006 | Jerdonek |
| 6,983,882 B2 | 1/2006 | Cassone |
| 6,991,174 B2 | 1/2006 | Zuili |
| 6,993,659 B2 | 1/2006 | Milgramm et al. |
| 7,007,174 B2 | 2/2006 | Wheeler et al. |
| 7,028,052 B2 | 4/2006 | Chapman et al. |
| 7,035,855 B1 | 4/2006 | Kilger et al. |
| 7,069,240 B2 | 6/2006 | Spero et al. |
| 7,083,090 B2 | 8/2006 | Zuili |
| 7,089,592 B2 | 8/2006 | Adjaoute et al. |
| 7,092,891 B2 | 8/2006 | Maus et al. |
| 7,104,444 B2 | 9/2006 | Suzuki |
| 7,158,622 B2 | 1/2007 | Lawyer et al. |
| 7,162,640 B2 | 1/2007 | Heath et al. |
| 7,174,335 B2 | 2/2007 | Kameda |
| 7,188,078 B2 | 3/2007 | Arnett et al. |
| 7,203,653 B1 | 4/2007 | McIntosh |
| 7,212,995 B2 | 5/2007 | Schulkins |
| 7,222,779 B1 | 5/2007 | Pineda-Sanchez et al. |
| 7,225,977 B2 | 6/2007 | Davis |
| 7,234,156 B2 | 6/2007 | French et al. |
| 7,240,059 B2 | 7/2007 | Bayliss et al. |
| 7,240,363 B1 | 7/2007 | Ellingson |
| 7,246,067 B2 | 7/2007 | Austin et al. |
| 7,246,740 B2 | 7/2007 | Swift et al. |
| 7,254,560 B2 | 8/2007 | Singhal |
| 7,263,506 B2 | 8/2007 | Lee et al. |
| 7,272,728 B2 | 9/2007 | Pierson et al. |
| 7,272,857 B1 | 9/2007 | Everhart |
| 7,277,869 B2 | 10/2007 | Starkman |
| 7,277,875 B2 | 10/2007 | Serrano-Morales et al. |
| 7,283,974 B2 | 10/2007 | Katz et al. |
| 7,289,607 B2 | 10/2007 | Bhargava et al. |

(56) References Cited

U.S. PATENT DOCUMENTS

| | | |
|---|---|---|
| 7,290,704 B1 | 11/2007 | Ball et al. |
| 7,298,873 B2 | 11/2007 | Miller, Jr. et al. |
| 7,310,743 B1 | 12/2007 | Gagne et al. |
| 7,314,162 B2 | 1/2008 | Carr et al. |
| 7,314,167 B1 | 1/2008 | Kiliccote |
| 7,330,871 B2 | 2/2008 | Barber |
| 7,333,635 B2 | 2/2008 | Tsantes et al. |
| 7,340,042 B2 | 3/2008 | Cluff et al. |
| 7,343,149 B2 | 3/2008 | Benco |
| 7,356,516 B2 | 4/2008 | Richey et al. |
| 7,370,044 B2 | 5/2008 | Mulhern et al. |
| 7,370,351 B1 | 5/2008 | Ramachandran et al. |
| 7,376,618 B1 | 5/2008 | Anderson et al. |
| 7,383,227 B2 | 6/2008 | Weinflash et al. |
| 7,386,448 B1 | 6/2008 | Poss et al. |
| 7,386,506 B2 | 6/2008 | Aoki et al. |
| 7,392,534 B2 | 6/2008 | Lu et al. |
| 7,395,273 B2 | 7/2008 | Khan et al. |
| 7,398,915 B1 | 7/2008 | Pineda-Sanchez et al. |
| 7,418,431 B1 | 8/2008 | Nies et al. |
| 7,428,509 B2 | 9/2008 | Klebanoff |
| 7,433,855 B2 | 10/2008 | Gavan et al. |
| 7,433,864 B2 | 10/2008 | Malik |
| 7,438,226 B2 | 10/2008 | Helsper et al. |
| 7,444,518 B1 | 10/2008 | Dharmarajan et al. |
| 7,457,401 B2 | 11/2008 | Lawyer et al. |
| 7,458,508 B1 | 12/2008 | Shao et al. |
| 7,466,235 B1 | 12/2008 | Kolb et al. |
| 7,467,401 B2 | 12/2008 | Cicchitto |
| 7,480,631 B1 | 1/2009 | Merced et al. |
| 7,481,363 B2 | 1/2009 | Zuili |
| 7,490,052 B2 | 2/2009 | Kilger et al. |
| 7,490,356 B2 | 2/2009 | Lieblich et al. |
| 7,497,374 B2 | 3/2009 | Helsper et al. |
| 7,509,117 B2 | 3/2009 | Yum |
| 7,512,221 B2 | 3/2009 | Toms |
| 7,519,558 B2 | 4/2009 | Ballard et al. |
| 7,522,060 B1 | 4/2009 | Tumperi et al. |
| 7,533,808 B2 | 5/2009 | Song et al. |
| 7,536,346 B2 | 5/2009 | Aliffi et al. |
| 7,540,021 B2 | 5/2009 | Page |
| 7,542,993 B2 | 6/2009 | Satterfield et al. |
| 7,543,739 B2 | 6/2009 | Brown et al. |
| 7,543,740 B2 | 6/2009 | Greene et al. |
| 7,546,271 B1 | 6/2009 | Chmielewski et al. |
| 7,548,886 B2 | 6/2009 | Kirkland et al. |
| 7,552,467 B2 | 6/2009 | Lindsay |
| 7,562,184 B2 | 7/2009 | Henmi et al. |
| 7,562,814 B1 | 7/2009 | Shao et al. |
| 7,568,616 B2 | 8/2009 | Zuili |
| 7,575,157 B2 | 8/2009 | Barnhardt et al. |
| 7,580,884 B2 | 8/2009 | Cook |
| 7,581,112 B2 | 8/2009 | Brown et al. |
| 7,584,146 B1 | 9/2009 | Duhon |
| 7,587,368 B2 | 9/2009 | Felsher |
| 7,591,425 B1 | 9/2009 | Zuili et al. |
| 7,593,891 B2 | 9/2009 | Kornegay et al. |
| 7,606,401 B2 | 10/2009 | Hoffman et al. |
| 7,606,790 B2 | 10/2009 | Levy |
| 7,610,216 B1 | 10/2009 | May et al. |
| 7,610,229 B1 | 10/2009 | Kornegay |
| 7,610,243 B2 | 10/2009 | Haggerty et al. |
| 7,620,596 B2 | 11/2009 | Knudson et al. |
| 7,623,844 B2 | 11/2009 | Herrmann et al. |
| 7,630,924 B1 | 12/2009 | Collins et al. |
| 7,630,932 B2 | 12/2009 | Danaher et al. |
| 7,636,853 B2 | 12/2009 | Cluts et al. |
| 7,644,868 B2 | 1/2010 | Hare |
| 7,647,344 B2 | 1/2010 | Skurtovich, Jr. et al. |
| 7,647,645 B2 | 1/2010 | Edeki et al. |
| 7,653,593 B2 | 1/2010 | Zarikian et al. |
| 7,657,431 B2 | 2/2010 | Hayakawa |
| 7,668,769 B2 | 2/2010 | Baker et al. |
| 7,668,840 B2 | 2/2010 | Bayliss et al. |
| 7,668,921 B2 | 2/2010 | Proux et al. |
| 7,672,865 B2 | 3/2010 | Kumar et al. |
| 7,673,793 B2 | 3/2010 | Greene et al. |
| 7,676,418 B1 | 3/2010 | Chung et al. |
| 7,676,433 B1 | 3/2010 | Ross et al. |
| 7,685,096 B2 | 3/2010 | Margolus et al. |
| 7,686,214 B1 | 3/2010 | Shao et al. |
| 7,689,007 B2 | 3/2010 | Bous et al. |
| 7,689,505 B2 | 3/2010 | Kasower |
| 7,689,506 B2 | 3/2010 | Fei et al. |
| 7,690,032 B1 | 3/2010 | Peirce |
| 7,701,364 B1 | 4/2010 | Zilberman |
| 7,702,550 B2 | 4/2010 | Perg et al. |
| 7,707,163 B2 | 4/2010 | Anzalone et al. |
| 7,708,190 B2 | 5/2010 | Brandt et al. |
| 7,708,200 B2 | 5/2010 | Helsper et al. |
| 7,711,635 B2 | 5/2010 | Steele et al. |
| 7,711,636 B2 | 5/2010 | Robida et al. |
| 7,720,750 B2 | 5/2010 | Brody |
| 7,725,300 B2 | 5/2010 | Pinto et al. |
| 7,734,523 B1 | 6/2010 | Cui et al. |
| 7,735,125 B1 | 6/2010 | Alvarez et al. |
| 7,742,982 B2 | 6/2010 | Chaudhuri et al. |
| 7,747,520 B2 | 6/2010 | Livermore et al. |
| 7,747,521 B2 | 6/2010 | Serio |
| 7,747,559 B2 | 6/2010 | Leitner et al. |
| 7,752,084 B2 | 7/2010 | Pettitt |
| 7,752,236 B2 | 7/2010 | Williams et al. |
| 7,752,554 B2 | 7/2010 | Biggs et al. |
| 7,756,783 B2 | 7/2010 | Crooks |
| 7,761,379 B2 | 7/2010 | Zoldi et al. |
| 7,761,384 B2 | 7/2010 | Madhogarhia |
| 7,774,270 B1 | 8/2010 | MacCloskey |
| 7,778,885 B1 | 8/2010 | Semprevivo et al. |
| 7,779,456 B2 | 8/2010 | Dennis et al. |
| 7,779,457 B2 | 8/2010 | Taylor |
| 7,783,515 B1 | 8/2010 | Kumar et al. |
| 7,788,184 B2 | 8/2010 | Kane |
| 7,792,715 B1 | 9/2010 | Kasower |
| 7,792,864 B1 | 9/2010 | Rice et al. |
| 7,793,835 B1 | 9/2010 | Coggeshall et al. |
| 7,801,811 B1 | 9/2010 | Merrell et al. |
| 7,801,828 B2 | 9/2010 | Candella et al. |
| 7,802,104 B2 | 9/2010 | Dickinson |
| 7,805,362 B2 | 9/2010 | Merrell et al. |
| 7,805,391 B2 | 9/2010 | Friedlander et al. |
| 7,813,944 B1 | 10/2010 | Luk et al. |
| 7,827,115 B2 | 11/2010 | Weller et al. |
| 7,832,006 B2 | 11/2010 | Chen et al. |
| 7,835,983 B2 | 11/2010 | Lefner et al. |
| 7,840,459 B1 | 11/2010 | Loftesness et al. |
| 7,841,004 B1 | 11/2010 | Balducci et al. |
| 7,844,520 B1 | 11/2010 | Franklin |
| 7,848,987 B2 | 12/2010 | Haig |
| 7,849,029 B2 | 12/2010 | Crooks et al. |
| 7,853,518 B2 | 12/2010 | Cagan |
| 7,853,526 B2 | 12/2010 | Milana |
| 7,853,533 B2 | 12/2010 | Eisen |
| 7,853,998 B2 | 12/2010 | Blaisdell et al. |
| 7,856,397 B2 | 12/2010 | Whipple et al. |
| 7,856,494 B2 | 12/2010 | Kulkarni |
| 7,860,769 B2 | 12/2010 | Benson |
| 7,860,783 B2 | 12/2010 | Yang et al. |
| 7,865,427 B2 | 1/2011 | Wright et al. |
| 7,865,439 B2 | 1/2011 | Seifert et al. |
| 7,865,937 B1 | 1/2011 | White et al. |
| 7,870,078 B2 | 1/2011 | Clark et al. |
| 7,870,599 B2 | 1/2011 | Pemmaraju |
| 7,874,488 B2 | 1/2011 | Parkinson |
| 7,877,304 B1 | 1/2011 | Coulter |
| 7,877,784 B2 | 1/2011 | Chow et al. |
| 7,882,548 B2 | 2/2011 | Heath et al. |
| 7,890,433 B2 | 2/2011 | Singhal |
| 7,904,360 B2 | 3/2011 | Evans |
| 7,904,367 B2 | 3/2011 | Chung et al. |
| 7,908,242 B1 | 3/2011 | Achanta |
| 7,909,246 B2 | 3/2011 | Hogg et al. |
| 7,912,865 B2 | 3/2011 | Akerman et al. |
| 7,917,715 B2 | 3/2011 | Tallman, Jr. |
| 7,925,582 B1 | 4/2011 | Kornegay et al. |

(56) References Cited

U.S. PATENT DOCUMENTS

| | | |
|---|---|---|
| 7,929,951 B2 | 4/2011 | Stevens et al. |
| 7,933,835 B2 | 4/2011 | Keane et al. |
| 7,941,363 B2 | 5/2011 | Tanaka et al. |
| 7,945,515 B2 | 5/2011 | Zoldi et al. |
| 7,950,577 B1 | 5/2011 | Daniel |
| 7,958,046 B2 | 6/2011 | Doerner et al. |
| 7,961,857 B2 | 6/2011 | Zoldi et al. |
| 7,962,404 B1 | 6/2011 | Metzger, II et al. |
| 7,962,467 B2 | 6/2011 | Howard et al. |
| 7,970,679 B2 | 6/2011 | Kasower |
| 7,970,698 B2 | 6/2011 | Gupta et al. |
| 7,970,701 B2 | 6/2011 | Lewis et al. |
| 7,971,246 B1 | 6/2011 | Emigh et al. |
| 7,975,299 B1 | 7/2011 | Balducci et al. |
| 7,983,976 B2 | 7/2011 | Nafeh et al. |
| 7,983,979 B2 | 7/2011 | Holland, IV |
| 7,984,849 B2 | 7/2011 | Berghel et al. |
| 7,988,043 B2 | 8/2011 | Davis |
| 7,991,201 B2 | 8/2011 | Bous et al. |
| 7,991,689 B1 | 8/2011 | Brunzell et al. |
| 7,991,716 B2 | 8/2011 | Crooks et al. |
| 7,991,751 B2 | 8/2011 | Peled et al. |
| 7,995,994 B2 | 8/2011 | Khetawat et al. |
| 7,996,521 B2 | 8/2011 | Chamberlain et al. |
| 8,001,034 B2 | 8/2011 | Chung et al. |
| 8,001,042 B1 | 8/2011 | Brunzell et al. |
| 8,001,153 B2 | 8/2011 | Skurtovich, Jr. et al. |
| 8,001,597 B2 | 8/2011 | Crooks |
| 8,005,749 B2 | 8/2011 | Ginsberg |
| 8,006,291 B2 | 8/2011 | Headley et al. |
| 8,009,873 B2 | 8/2011 | Chapman |
| 8,019,678 B2 | 9/2011 | Wright et al. |
| 8,020,763 B1 | 9/2011 | Kowalchyk et al. |
| 8,024,263 B2 | 9/2011 | Zarikian et al. |
| 8,024,271 B2 | 9/2011 | Grant |
| 8,027,439 B2 | 9/2011 | Zoldi et al. |
| 8,027,518 B2 | 9/2011 | Baker et al. |
| 8,027,947 B2 | 9/2011 | Hinsz et al. |
| 8,028,168 B2 | 9/2011 | Smithies et al. |
| 8,028,326 B2 | 9/2011 | Palmer et al. |
| 8,028,329 B2 | 9/2011 | Whitcomb |
| 8,028,896 B2 | 10/2011 | Carter et al. |
| 8,032,448 B2 | 10/2011 | Anderson et al. |
| 8,032,449 B2 | 10/2011 | Hu et al. |
| 8,032,927 B2 | 10/2011 | Ross |
| 8,037,097 B2 | 10/2011 | Guo et al. |
| 8,037,512 B2 | 10/2011 | Wright et al. |
| 8,041,597 B2 | 10/2011 | Li et al. |
| 8,042,159 B2 | 10/2011 | Basner et al. |
| 8,042,193 B1 | 10/2011 | Piliouras |
| 8,049,596 B2 | 11/2011 | Sato |
| 8,055,667 B2 | 11/2011 | Levy |
| 8,056,128 B1 | 11/2011 | Dingle et al. |
| 8,058,972 B2 | 11/2011 | Mohanty |
| 8,060,424 B2 | 11/2011 | Kasower |
| 8,060,915 B2 | 11/2011 | Voice et al. |
| 8,060,916 B2 | 11/2011 | Bajaj et al. |
| 8,065,233 B2 | 11/2011 | Lee et al. |
| 8,065,525 B2 | 11/2011 | Zilberman |
| 8,069,053 B2 | 11/2011 | Gervais et al. |
| 8,069,084 B2 | 11/2011 | Mackouse |
| 8,069,256 B2 | 11/2011 | Rasti |
| 8,069,485 B2 | 11/2011 | Carter |
| 8,078,569 B2 | 12/2011 | Kennel |
| 8,090,648 B2 | 1/2012 | Zoldi et al. |
| 8,104,679 B2 | 1/2012 | Brown |
| 8,116,731 B2 | 2/2012 | Buhrmann et al. |
| 8,121,962 B2 | 2/2012 | Vaiciulis et al. |
| 8,131,615 B2 | 3/2012 | Diev et al. |
| 8,151,327 B2 | 4/2012 | Eisen |
| 8,195,549 B2 | 6/2012 | Kasower |
| 8,201,257 B1 | 6/2012 | Andres et al. |
| 8,204,774 B2 | 6/2012 | Chwast et al. |
| 8,214,262 B1 | 7/2012 | Semprevivo et al. |
| 8,214,285 B2 | 7/2012 | Hu et al. |
| 8,224,723 B2 | 7/2012 | Bosch et al. |
| 8,225,395 B2 | 7/2012 | Atwood et al. |
| 8,239,677 B2 | 8/2012 | Colson |
| 8,244,629 B2 | 8/2012 | Lewis et al. |
| 8,260,914 B1 | 9/2012 | Ranjan |
| 8,280,805 B1 | 10/2012 | Abrahams et al. |
| 8,280,833 B2 | 10/2012 | Miltonberger |
| 8,285,613 B1 | 10/2012 | Coulter |
| 8,285,636 B2 | 10/2012 | Curry et al. |
| 8,296,225 B2 | 10/2012 | Maddipati et al. |
| 8,296,229 B1 | 10/2012 | Yellin et al. |
| 8,296,250 B2 | 10/2012 | Crooks et al. |
| 8,332,338 B2 | 12/2012 | Vaiciulis et al. |
| 8,346,593 B2 | 1/2013 | Fanelli |
| 8,355,896 B2 | 1/2013 | Kumar et al. |
| 8,359,278 B2 | 1/2013 | Domenikos et al. |
| 8,364,588 B2 | 1/2013 | Celka et al. |
| 8,374,973 B2 | 2/2013 | Herbrich et al. |
| 8,386,377 B1 | 2/2013 | Xiong et al. |
| 8,429,070 B2 | 4/2013 | Hu et al. |
| 8,468,090 B2 | 6/2013 | Lesandro et al. |
| 8,489,479 B2 | 7/2013 | Slater et al. |
| 8,510,329 B2 | 8/2013 | Balkir et al. |
| 8,515,844 B2 | 8/2013 | Kasower |
| 8,516,439 B2 | 8/2013 | Brass et al. |
| 8,543,499 B2 | 9/2013 | Haggerty et al. |
| 8,548,137 B2 | 10/2013 | Zoldi et al. |
| 8,548,903 B2 | 10/2013 | Becker |
| 8,549,590 B1 | 10/2013 | de Villiers Prichard et al. |
| 8,559,607 B2 | 10/2013 | Zoldi et al. |
| 8,567,669 B2 | 10/2013 | Griegel et al. |
| 8,578,496 B1 | 11/2013 | Krishnappa |
| 8,630,938 B2 | 1/2014 | Cheng et al. |
| 8,639,920 B2 | 1/2014 | Stack et al. |
| 8,645,301 B2 | 2/2014 | Vaiciulis et al. |
| 8,671,115 B2 | 3/2014 | Skurtovich, Jr. et al. |
| 8,676,684 B2 | 3/2014 | Newman et al. |
| 8,676,726 B2 | 3/2014 | Hore et al. |
| 8,682,755 B2 | 3/2014 | Bucholz et al. |
| 8,683,586 B2 | 3/2014 | Crooks |
| 8,694,427 B2 | 4/2014 | Maddipati et al. |
| 8,725,613 B1 | 5/2014 | Celka et al. |
| 8,776,225 B2 | 7/2014 | Pierson et al. |
| 8,781,953 B2 | 7/2014 | Kasower |
| 8,781,975 B2 | 7/2014 | Bennett et al. |
| 8,793,777 B2 | 7/2014 | Colson |
| 8,805,836 B2 | 8/2014 | Hore et al. |
| 8,812,387 B1 | 8/2014 | Samler et al. |
| 8,819,793 B2 | 8/2014 | Gottschalk, Jr. |
| 8,824,648 B2 | 9/2014 | Zoldi et al. |
| 8,826,393 B2 | 9/2014 | Eisen |
| 8,862,514 B2 | 10/2014 | Eisen |
| 8,862,526 B2 | 10/2014 | Miltonberger |
| 8,909,664 B2 | 12/2014 | Hopkins |
| 8,918,891 B2 | 12/2014 | Coggeshall et al. |
| 8,949,981 B1 | 2/2015 | Trollope et al. |
| 9,118,646 B2 | 8/2015 | Pierson et al. |
| 9,191,403 B2 | 11/2015 | Zoldi et al. |
| 9,194,899 B2 | 11/2015 | Zoldi et al. |
| 9,196,004 B2 | 11/2015 | Eisen |
| 9,210,156 B1 * | 12/2015 | Little ................. G06F 16/9535 |
| 9,235,728 B2 | 1/2016 | Gottschalk, Jr. et al. |
| 9,251,541 B2 | 2/2016 | Celka et al. |
| 9,256,624 B2 | 2/2016 | Skurtovich, Jr. et al. |
| 9,280,658 B2 | 3/2016 | Coggeshall et al. |
| 9,361,597 B2 | 6/2016 | Britton et al. |
| 9,367,520 B2 | 6/2016 | Zhao et al. |
| 9,390,384 B2 | 7/2016 | Eisen |
| 9,412,141 B2 | 8/2016 | Prichard et al. |
| 9,531,738 B2 | 12/2016 | Zoldi et al. |
| 9,558,368 B2 | 1/2017 | Gottschalk, Jr. et al. |
| 9,595,066 B2 | 3/2017 | Samler et al. |
| 9,652,802 B1 | 5/2017 | Kasower |
| 9,704,195 B2 | 7/2017 | Zoldi |
| 9,710,523 B2 | 7/2017 | Skurtovich, Jr. et al. |
| 9,710,868 B2 | 7/2017 | Gottschalk, Jr. et al. |
| 9,754,256 B2 | 9/2017 | Britton et al. |
| 9,754,311 B2 | 9/2017 | Eisen |
| 9,773,227 B2 | 9/2017 | Zoldi et al. |

(56) References Cited

U.S. PATENT DOCUMENTS

| | | |
|---|---|---|
| 9,953,321 B2 | 4/2018 | Zoldi et al. |
| 10,043,213 B2 | 8/2018 | Straub et al. |
| 10,089,679 B2 | 10/2018 | Eisen |
| 10,089,686 B2 | 10/2018 | Straub et al. |
| 10,102,530 B2 | 10/2018 | Zoldi et al. |
| 10,115,153 B2 | 10/2018 | Zoldi et al. |
| 10,152,736 B2 | 12/2018 | Yang et al. |
| 10,217,163 B2 | 2/2019 | Straub et al. |
| 10,242,540 B2 | 3/2019 | Chen et al. |
| 10,339,527 B1 * | 7/2019 | Coleman ............ G06Q 20/4016 |
| 10,373,061 B2 | 8/2019 | Kennel et al. |
| 10,430,604 B2 | 10/2019 | Spinelli et al. |
| 10,438,308 B2 | 10/2019 | Prichard et al. |
| 10,497,034 B2 | 12/2019 | Yang et al. |
| 10,510,025 B2 | 12/2019 | Zoldi et al. |
| 10,528,948 B2 | 1/2020 | Zoldi et al. |
| 10,579,938 B2 | 3/2020 | Zoldi et al. |
| 10,592,982 B2 | 3/2020 | Samler et al. |
| 10,593,004 B2 | 3/2020 | Gottschalk, Jr. et al. |
| 2001/0014868 A1 | 8/2001 | Herz et al. |
| 2001/0014878 A1 | 8/2001 | Mitra et al. |
| 2001/0027413 A1 | 10/2001 | Bhutta |
| 2001/0029470 A1 | 10/2001 | Schultz et al. |
| 2001/0032158 A1 | 10/2001 | Starkman |
| 2001/0034631 A1 | 10/2001 | Kiselik |
| 2001/0039523 A1 | 11/2001 | Iwamoto |
| 2002/0010684 A1 | 1/2002 | Moskowitz |
| 2002/0013899 A1 | 1/2002 | Faul |
| 2002/0019804 A1 | 2/2002 | Sutton |
| 2002/0019938 A1 | 2/2002 | Aarons |
| 2002/0032635 A1 | 3/2002 | Harris et al. |
| 2002/0040344 A1 | 4/2002 | Preiser et al. |
| 2002/0042879 A1 | 4/2002 | Gould et al. |
| 2002/0052841 A1 | 5/2002 | Guthrie et al. |
| 2002/0059521 A1 | 5/2002 | Tasler |
| 2002/0062185 A1 | 5/2002 | Runge et al. |
| 2002/0062281 A1 | 5/2002 | Singhal |
| 2002/0073044 A1 | 6/2002 | Singhal |
| 2002/0077178 A1 | 6/2002 | Oberberger et al. |
| 2002/0077964 A1 | 6/2002 | Brody et al. |
| 2002/0080256 A1 | 6/2002 | Bates et al. |
| 2002/0087460 A1 | 7/2002 | Hornung |
| 2002/0099649 A1 | 7/2002 | Lee et al. |
| 2002/0119824 A1 | 8/2002 | Allen |
| 2002/0130176 A1 | 9/2002 | Suzuki |
| 2002/0138417 A1 | 9/2002 | Lawrence |
| 2002/0138751 A1 | 9/2002 | Dutta |
| 2002/0147695 A1 | 10/2002 | Khedkar et al. |
| 2002/0156676 A1 | 10/2002 | Ahrens et al. |
| 2002/0161664 A1 | 10/2002 | Shaya et al. |
| 2002/0161711 A1 | 10/2002 | Sartor et al. |
| 2002/0173994 A1 | 11/2002 | Ferguson, III |
| 2002/0178112 A1 | 11/2002 | Goeller et al. |
| 2002/0184509 A1 | 12/2002 | Scheidt et al. |
| 2002/0188544 A1 | 12/2002 | Wizon et al. |
| 2003/0004879 A1 | 1/2003 | Demoff et al. |
| 2003/0009426 A1 | 1/2003 | Ruiz-Sanchez |
| 2003/0018549 A1 | 1/2003 | Fei et al. |
| 2003/0033261 A1 | 2/2003 | Knegendorf |
| 2003/0046554 A1 | 3/2003 | Leydier et al. |
| 2003/0048904 A1 | 3/2003 | Wang et al. |
| 2003/0050882 A1 | 3/2003 | Degen et al. |
| 2003/0057278 A1 | 3/2003 | Wong |
| 2003/0061163 A1 | 3/2003 | Durfield |
| 2003/0065563 A1 | 4/2003 | Elliott et al. |
| 2003/0070101 A1 | 4/2003 | Buscemi |
| 2003/0078877 A1 | 4/2003 | Beirne et al. |
| 2003/0093366 A1 | 5/2003 | Halper et al. |
| 2003/0097320 A1 | 5/2003 | Gordon |
| 2003/0105696 A1 | 6/2003 | Kalotay et al. |
| 2003/0115133 A1 | 6/2003 | Bian |
| 2003/0143980 A1 | 7/2003 | Choi et al. |
| 2003/0149744 A1 | 8/2003 | Bierre et al. |
| 2003/0153299 A1 | 8/2003 | Perfit et al. |
| 2003/0158751 A1 | 8/2003 | Suresh et al. |
| 2003/0158960 A1 | 8/2003 | Engberg |
| 2003/0182214 A1 | 9/2003 | Taylor |
| 2003/0195859 A1 | 10/2003 | Lawrence |
| 2003/0200447 A1 | 10/2003 | Sjoblom |
| 2003/0208428 A1 | 11/2003 | Raynes et al. |
| 2003/0222500 A1 | 12/2003 | Bayeur et al. |
| 2003/0225656 A1 | 12/2003 | Aberman et al. |
| 2003/0225692 A1 | 12/2003 | Bosch et al. |
| 2003/0225742 A1 | 12/2003 | Tenner et al. |
| 2003/0233278 A1 | 12/2003 | Marshall |
| 2004/0004117 A1 | 1/2004 | Suzuki |
| 2004/0005912 A1 | 1/2004 | Hubbe et al. |
| 2004/0010698 A1 | 1/2004 | Rolfe |
| 2004/0024709 A1 | 2/2004 | Yu et al. |
| 2004/0026496 A1 | 2/2004 | Zuili |
| 2004/0030649 A1 | 2/2004 | Nelson et al. |
| 2004/0039586 A1 | 2/2004 | Garvey et al. |
| 2004/0054619 A1 | 3/2004 | Watson et al. |
| 2004/0059653 A1 | 3/2004 | Verkuylen et al. |
| 2004/0064401 A1 | 4/2004 | Palaghita et al. |
| 2004/0078324 A1 | 4/2004 | Lonnberg et al. |
| 2004/0103147 A1 | 5/2004 | Flesher et al. |
| 2004/0107363 A1 | 6/2004 | Monteverde |
| 2004/0110119 A1 | 6/2004 | Riconda et al. |
| 2004/0111305 A1 | 6/2004 | Gavan et al. |
| 2004/0111335 A1 | 6/2004 | Black et al. |
| 2004/0117235 A1 | 6/2004 | Shacham |
| 2004/0128227 A1 | 7/2004 | Whipple et al. |
| 2004/0128232 A1 | 7/2004 | Descloux |
| 2004/0133440 A1 | 7/2004 | Carolan et al. |
| 2004/0143526 A1 | 7/2004 | Monasterio et al. |
| 2004/0149820 A1 | 8/2004 | Zuili |
| 2004/0149827 A1 | 8/2004 | Zuili |
| 2004/0153330 A1 | 8/2004 | Miller et al. |
| 2004/0153656 A1 | 8/2004 | Cluts et al. |
| 2004/0158520 A1 | 8/2004 | Noh |
| 2004/0158523 A1 | 8/2004 | Dort |
| 2004/0158723 A1 | 8/2004 | Root |
| 2004/0167793 A1 | 8/2004 | Masuoka et al. |
| 2004/0177046 A1 | 9/2004 | Ogram |
| 2004/0193538 A1 | 9/2004 | Raines |
| 2004/0199456 A1 | 10/2004 | Flint et al. |
| 2004/0199462 A1 | 10/2004 | Starrs |
| 2004/0204948 A1 | 10/2004 | Singletary et al. |
| 2004/0225594 A1 | 11/2004 | Nolan, III et al. |
| 2004/0230448 A1 | 11/2004 | Schaich |
| 2004/0230527 A1 | 11/2004 | Hansen et al. |
| 2004/0230538 A1 | 11/2004 | Clifton et al. |
| 2004/0234117 A1 | 11/2004 | Tibor |
| 2004/0243514 A1 | 12/2004 | Wankmueller |
| 2004/0243518 A1 | 12/2004 | Clifton et al. |
| 2004/0243567 A1 | 12/2004 | Levy |
| 2004/0250085 A1 | 12/2004 | Tattan et al. |
| 2004/0255127 A1 | 12/2004 | Arnouse |
| 2004/0260922 A1 | 12/2004 | Goodman et al. |
| 2005/0001028 A1 | 1/2005 | Zuili |
| 2005/0005168 A1 | 1/2005 | Dick |
| 2005/0010513 A1 | 1/2005 | Duckworth et al. |
| 2005/0010780 A1 | 1/2005 | Kane et al. |
| 2005/0021476 A1 | 1/2005 | Candella et al. |
| 2005/0021519 A1 | 1/2005 | Ghouri |
| 2005/0027983 A1 | 2/2005 | Klawon |
| 2005/0038726 A1 | 2/2005 | Salomon et al. |
| 2005/0038737 A1 | 2/2005 | Norris |
| 2005/0050577 A1 | 3/2005 | Westbrook et al. |
| 2005/0058262 A1 | 3/2005 | Timmins et al. |
| 2005/0065950 A1 | 3/2005 | Chaganti et al. |
| 2005/0071282 A1 | 3/2005 | Lu et al. |
| 2005/0075985 A1 | 4/2005 | Cartmell |
| 2005/0081052 A1 | 4/2005 | Washington |
| 2005/0086161 A1 | 4/2005 | Gallant |
| 2005/0091164 A1 | 4/2005 | Varble |
| 2005/0097039 A1 | 5/2005 | Kulcsar et al. |
| 2005/0097051 A1 | 5/2005 | Madill, Jr. et al. |
| 2005/0097364 A1 | 5/2005 | Edeki et al. |
| 2005/0102206 A1 | 5/2005 | Savasoglu et al. |
| 2005/0105719 A1 | 5/2005 | Huda |
| 2005/0125226 A1 | 6/2005 | Magee |
| 2005/0125686 A1 | 6/2005 | Brandt |

(56) References Cited

U.S. PATENT DOCUMENTS

| | | |
|---|---|---|
| 2005/0138391 A1 | 6/2005 | Mandalia et al. |
| 2005/0144143 A1 | 6/2005 | Freiberg |
| 2005/0154664 A1 | 7/2005 | Guy et al. |
| 2005/0154665 A1 | 7/2005 | Kerr |
| 2005/0154671 A1 | 7/2005 | Doan et al. |
| 2005/0165667 A1 | 7/2005 | Cox |
| 2005/0197953 A1 | 9/2005 | Broadbent et al. |
| 2005/0203885 A1 | 9/2005 | Chenevich et al. |
| 2005/0216953 A1 | 9/2005 | Ellingson |
| 2005/0229007 A1 | 10/2005 | Bolle et al. |
| 2005/0240578 A1 | 10/2005 | Biederman et al. |
| 2005/0242173 A1 | 11/2005 | Suzuki |
| 2005/0251474 A1 | 11/2005 | Shinn et al. |
| 2005/0256809 A1 | 11/2005 | Sadri |
| 2005/0262014 A1 | 11/2005 | Fickes |
| 2005/0273333 A1 | 12/2005 | Morin et al. |
| 2005/0278542 A1 | 12/2005 | Pierson et al. |
| 2005/0279827 A1 | 12/2005 | Mascavage et al. |
| 2005/0279869 A1 | 12/2005 | Barklage |
| 2006/0004663 A1 | 1/2006 | Singhal |
| 2006/0014129 A1 | 1/2006 | Coleman et al. |
| 2006/0032909 A1 | 2/2006 | Seegar |
| 2006/0041464 A1 | 2/2006 | Powers et al. |
| 2006/0045105 A1 | 3/2006 | Dobosz et al. |
| 2006/0047605 A1 | 3/2006 | Ahmad |
| 2006/0059073 A1 | 3/2006 | Walzak |
| 2006/0059110 A1 | 3/2006 | Madhok et al. |
| 2006/0064374 A1 | 3/2006 | Helsper et al. |
| 2006/0074798 A1 | 4/2006 | Din et al. |
| 2006/0074986 A1 | 4/2006 | Mallalieu et al. |
| 2006/0080230 A1 | 4/2006 | Freiberg |
| 2006/0080263 A1 | 4/2006 | Willis et al. |
| 2006/0089905 A1 | 4/2006 | Song et al. |
| 2006/0101508 A1 | 5/2006 | Taylor |
| 2006/0106605 A1 | 5/2006 | Saunders et al. |
| 2006/0112279 A1 | 5/2006 | Cohen et al. |
| 2006/0112280 A1 | 5/2006 | Cohen et al. |
| 2006/0129428 A1 | 6/2006 | Wennberg |
| 2006/0129481 A1 | 6/2006 | Bhatt et al. |
| 2006/0129840 A1 | 6/2006 | Milgramm et al. |
| 2006/0131390 A1 | 6/2006 | Kim |
| 2006/0136332 A1 | 6/2006 | Ziegler |
| 2006/0140460 A1 | 6/2006 | Coutts |
| 2006/0143073 A1 | 6/2006 | Engel et al. |
| 2006/0144924 A1 | 7/2006 | Stover |
| 2006/0149580 A1 | 7/2006 | Helsper et al. |
| 2006/0149674 A1 | 7/2006 | Cook et al. |
| 2006/0161435 A1 | 7/2006 | Atef et al. |
| 2006/0173776 A1 | 8/2006 | Shalley et al. |
| 2006/0173792 A1 | 8/2006 | Glass |
| 2006/0177226 A1 | 8/2006 | Ellis, III |
| 2006/0178971 A1 | 8/2006 | Owen et al. |
| 2006/0179004 A1 | 8/2006 | Fuchs |
| 2006/0195351 A1 | 8/2006 | Bayburtian |
| 2006/0200855 A1 | 9/2006 | Willis |
| 2006/0202012 A1 | 9/2006 | Grano et al. |
| 2006/0204051 A1 | 9/2006 | Holland, IV |
| 2006/0206725 A1 | 9/2006 | Milgramm et al. |
| 2006/0212386 A1 | 9/2006 | Willey et al. |
| 2006/0218069 A1 | 9/2006 | Aberman et al. |
| 2006/0229961 A1 | 10/2006 | Lyftogt et al. |
| 2006/0239512 A1 | 10/2006 | Petrillo |
| 2006/0239513 A1 | 10/2006 | Song et al. |
| 2006/0242046 A1 | 10/2006 | Haggerty et al. |
| 2006/0242047 A1 | 10/2006 | Haggerty et al. |
| 2006/0253358 A1 | 11/2006 | Delgrosso et al. |
| 2006/0253583 A1 | 11/2006 | Dixon et al. |
| 2006/0255914 A1 | 11/2006 | Westman |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0273158 A1 | 12/2006 | Suzuki |
| 2006/0277043 A1 | 12/2006 | Tomes et al. |
| 2006/0282285 A1 | 12/2006 | Helsper et al. |
| 2006/0282372 A1 | 12/2006 | Endres et al. |
| 2006/0282395 A1 | 12/2006 | Leibowitz |
| 2006/0287765 A1 | 12/2006 | Kraft |
| 2006/0288090 A1 | 12/2006 | Kraft |
| 2006/0294023 A1 | 12/2006 | Lu |
| 2007/0005508 A1 | 1/2007 | Chiang |
| 2007/0011100 A1 | 1/2007 | Libin et al. |
| 2007/0016500 A1 | 1/2007 | Chatterji et al. |
| 2007/0016521 A1 | 1/2007 | Wang |
| 2007/0016522 A1 | 1/2007 | Wang |
| 2007/0022141 A1 | 1/2007 | Singleton et al. |
| 2007/0038483 A1 | 2/2007 | Wood |
| 2007/0038568 A1 | 2/2007 | Greene et al. |
| 2007/0040017 A1 | 2/2007 | Kozlay |
| 2007/0040019 A1 | 2/2007 | Berghel et al. |
| 2007/0043577 A1* | 2/2007 | Kasower ............ G06Q 40/00 705/35 |
| 2007/0047770 A1 | 3/2007 | Swope et al. |
| 2007/0048765 A1 | 3/2007 | Abramson |
| 2007/0050638 A1 | 3/2007 | Rasti |
| 2007/0059442 A1 | 3/2007 | Sabeta |
| 2007/0061273 A1 | 3/2007 | Greene et al. |
| 2007/0067207 A1 | 3/2007 | Haggerty et al. |
| 2007/0067297 A1 | 3/2007 | Kublickis |
| 2007/0072190 A1 | 3/2007 | Aggarwal |
| 2007/0073622 A1 | 3/2007 | Kane |
| 2007/0073630 A1 | 3/2007 | Greene et al. |
| 2007/0078786 A1 | 4/2007 | Bous et al. |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0087795 A1 | 4/2007 | Aletto et al. |
| 2007/0093234 A1 | 4/2007 | Willis et al. |
| 2007/0094137 A1 | 4/2007 | Phillips et al. |
| 2007/0094264 A1 | 4/2007 | Nair |
| 2007/0100774 A1 | 5/2007 | Abdon |
| 2007/0106582 A1 | 5/2007 | Baker et al. |
| 2007/0106611 A1 | 5/2007 | Larsen |
| 2007/0107050 A1 | 5/2007 | Selvarajan |
| 2007/0109103 A1 | 5/2007 | Jedrey et al. |
| 2007/0110282 A1 | 5/2007 | Millsapp |
| 2007/0112667 A1 | 5/2007 | Rucker |
| 2007/0112668 A1 | 5/2007 | Celano et al. |
| 2007/0118393 A1 | 5/2007 | Rosen et al. |
| 2007/0155411 A1 | 7/2007 | Morrison |
| 2007/0157299 A1 | 7/2007 | Hare |
| 2007/0168246 A1 | 7/2007 | Haggerty et al. |
| 2007/0168480 A1 | 7/2007 | Biggs et al. |
| 2007/0174208 A1 | 7/2007 | Black et al. |
| 2007/0179903 A1 | 8/2007 | Seinfeld et al. |
| 2007/0180209 A1 | 8/2007 | Tallman |
| 2007/0180263 A1 | 8/2007 | Delgrosso et al. |
| 2007/0186276 A1 | 8/2007 | McRae et al. |
| 2007/0192248 A1 | 8/2007 | West |
| 2007/0192853 A1 | 8/2007 | Shraim et al. |
| 2007/0198410 A1 | 8/2007 | Labgold et al. |
| 2007/0205266 A1 | 9/2007 | Carr et al. |
| 2007/0208669 A1 | 9/2007 | Rivette et al. |
| 2007/0214037 A1 | 9/2007 | Shubert et al. |
| 2007/0214365 A1 | 9/2007 | Cornett et al. |
| 2007/0219928 A1 | 9/2007 | Madhogarhia |
| 2007/0220594 A1 | 9/2007 | Tulsyan |
| 2007/0226093 A1 | 9/2007 | Chan et al. |
| 2007/0226129 A1 | 9/2007 | Liao et al. |
| 2007/0233614 A1 | 10/2007 | McNelley et al. |
| 2007/0234427 A1 | 10/2007 | Gardner et al. |
| 2007/0244782 A1 | 10/2007 | Chimento |
| 2007/0244807 A1 | 10/2007 | Andringa et al. |
| 2007/0250704 A1 | 10/2007 | Hallam-Baker |
| 2007/0250920 A1 | 10/2007 | Lindsay |
| 2007/0266439 A1 | 11/2007 | Kraft |
| 2007/0282730 A1 | 12/2007 | Carpenter et al. |
| 2007/0288355 A1 | 12/2007 | Roland et al. |
| 2007/0288360 A1 | 12/2007 | Seeklus |
| 2007/0288559 A1 | 12/2007 | Parsadayan |
| 2007/0291995 A1 | 12/2007 | Rivera |
| 2007/0292006 A1 | 12/2007 | Johnson |
| 2007/0294104 A1 | 12/2007 | Boaz et al. |

(56) References Cited

U.S. PATENT DOCUMENTS

| | | |
|---|---|---|
| 2007/0299759 A1 | 12/2007 | Kelly |
| 2008/0010203 A1 | 1/2008 | Grant |
| 2008/0010683 A1 | 1/2008 | Baddour et al. |
| 2008/0010687 A1 | 1/2008 | Gonen et al. |
| 2008/0015887 A1 | 1/2008 | Drabek et al. |
| 2008/0021804 A1 | 1/2008 | Deckoff |
| 2008/0027857 A1 | 1/2008 | Benson |
| 2008/0027858 A1 | 1/2008 | Benson |
| 2008/0052182 A1 | 2/2008 | Marshall |
| 2008/0059236 A1 | 3/2008 | Cartier |
| 2008/0059352 A1 | 3/2008 | Chandran |
| 2008/0059364 A1 | 3/2008 | Tidwell et al. |
| 2008/0059366 A1 | 3/2008 | Fou |
| 2008/0063172 A1 | 3/2008 | Ahuja et al. |
| 2008/0066188 A1 | 3/2008 | Kwak |
| 2008/0071882 A1 | 3/2008 | Hering et al. |
| 2008/0076386 A1 | 3/2008 | Khetawat et al. |
| 2008/0077526 A1 | 3/2008 | Arumugam |
| 2008/0098222 A1 | 4/2008 | Zilberman |
| 2008/0103798 A1 | 5/2008 | Domenikos et al. |
| 2008/0103799 A1 | 5/2008 | Domenikos et al. |
| 2008/0103800 A1 | 5/2008 | Domenikos et al. |
| 2008/0103811 A1 | 5/2008 | Sosa |
| 2008/0103972 A1 | 5/2008 | Lanc |
| 2008/0104021 A1 | 5/2008 | Cai et al. |
| 2008/0104672 A1 | 5/2008 | Lunde et al. |
| 2008/0114837 A1 | 5/2008 | Biggs et al. |
| 2008/0120237 A1 | 5/2008 | Lin |
| 2008/0126116 A1 | 5/2008 | Singhai |
| 2008/0126233 A1 | 5/2008 | Hogan |
| 2008/0147454 A1 | 6/2008 | Walker et al. |
| 2008/0154758 A1 | 6/2008 | Schattmaier et al. |
| 2008/0162202 A1 | 7/2008 | Khanna et al. |
| 2008/0162383 A1 | 7/2008 | Kraft |
| 2008/0167883 A1 | 7/2008 | Thavildar Khazaneh |
| 2008/0175360 A1 | 7/2008 | Schwarz et al. |
| 2008/0177655 A1 | 7/2008 | Zalik |
| 2008/0177841 A1 | 7/2008 | Sinn et al. |
| 2008/0189789 A1 | 8/2008 | Lamontagne |
| 2008/0208548 A1 | 8/2008 | Metzger et al. |
| 2008/0208610 A1 | 8/2008 | Thomas et al. |
| 2008/0208726 A1 | 8/2008 | Tsantes et al. |
| 2008/0217400 A1 | 9/2008 | Portano |
| 2008/0228635 A1 | 9/2008 | Megdal et al. |
| 2008/0243680 A1 | 10/2008 | Megdal et al. |
| 2008/0244717 A1 | 10/2008 | Jelatis et al. |
| 2008/0255922 A1 | 10/2008 | Feldman et al. |
| 2008/0255992 A1 | 10/2008 | Lin |
| 2008/0256613 A1 | 10/2008 | Grover |
| 2008/0281737 A1 | 11/2008 | Fajardo |
| 2008/0281743 A1 | 11/2008 | Pettit |
| 2008/0288382 A1 | 11/2008 | Smith et al. |
| 2008/0288430 A1 | 11/2008 | Friedlander et al. |
| 2008/0288790 A1 | 11/2008 | Wilson |
| 2008/0294540 A1 | 11/2008 | Celka et al. |
| 2008/0294689 A1 | 11/2008 | Metzger et al. |
| 2008/0296367 A1 | 12/2008 | Parkinson |
| 2008/0296382 A1 | 12/2008 | Connell, II et al. |
| 2008/0300877 A1 | 12/2008 | Gilbert et al. |
| 2008/0319889 A1 | 12/2008 | Hammad |
| 2009/0007220 A1 | 1/2009 | Ormazabal et al. |
| 2009/0018934 A1 | 1/2009 | Peng et al. |
| 2009/0021349 A1 | 1/2009 | Errico et al. |
| 2009/0024417 A1 | 1/2009 | Marks et al. |
| 2009/0024505 A1 | 1/2009 | Patel et al. |
| 2009/0024636 A1 | 1/2009 | Shiloh |
| 2009/0024663 A1 | 1/2009 | McGovern |
| 2009/0026270 A1 | 1/2009 | Connell, II et al. |
| 2009/0043637 A1 | 2/2009 | Eder |
| 2009/0044279 A1 | 2/2009 | Crawford et al. |
| 2009/0048957 A1 | 2/2009 | Celano |
| 2009/0079539 A1 | 3/2009 | Johnson |
| 2009/0094311 A1 | 4/2009 | Awadallah et al. |
| 2009/0099960 A1 | 4/2009 | Robida et al. |
| 2009/0106153 A1 | 4/2009 | Ezra |
| 2009/0106846 A1 | 4/2009 | Dupray et al. |
| 2009/0112650 A1 | 4/2009 | Iwane |
| 2009/0119106 A1 | 5/2009 | Rajakumar et al. |
| 2009/0119299 A1 | 5/2009 | Rhodes |
| 2009/0125369 A1 | 5/2009 | Kloostra et al. |
| 2009/0125439 A1 | 5/2009 | Zarikian et al. |
| 2009/0125463 A1 | 5/2009 | Hido |
| 2009/0138391 A1 | 5/2009 | Dudley et al. |
| 2009/0141318 A1 | 6/2009 | Hughes |
| 2009/0151005 A1 | 6/2009 | Bell et al. |
| 2009/0158404 A1 | 6/2009 | Hahn et al. |
| 2009/0164380 A1 | 6/2009 | Brown |
| 2009/0172815 A1 | 7/2009 | Gu et al. |
| 2009/0182653 A1 | 7/2009 | Zimiles |
| 2009/0199264 A1 | 8/2009 | Lang |
| 2009/0205032 A1 | 8/2009 | Hinton et al. |
| 2009/0206993 A1 | 8/2009 | Di Mambro et al. |
| 2009/0216560 A1 | 8/2009 | Siegel |
| 2009/0222308 A1 | 9/2009 | Zoldi et al. |
| 2009/0222362 A1 | 9/2009 | Stood et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0222897 A1 | 9/2009 | Carow et al. |
| 2009/0224875 A1 | 9/2009 | Rabinowitz et al. |
| 2009/0224889 A1 | 9/2009 | Aggarwal et al. |
| 2009/0226056 A1 | 9/2009 | Vlachos et al. |
| 2009/0234738 A1 | 9/2009 | Britton et al. |
| 2009/0240609 A1 | 9/2009 | Cho et al. |
| 2009/0241168 A1 | 9/2009 | Readshaw |
| 2009/0241173 A1 | 9/2009 | Troyansky |
| 2009/0248198 A1 | 10/2009 | Siegel et al. |
| 2009/0248497 A1 | 10/2009 | Hueter |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0254476 A1 | 10/2009 | Sharma et al. |
| 2009/0254484 A1 | 10/2009 | Forero et al. |
| 2009/0257595 A1 | 10/2009 | de Cesare et al. |
| 2009/0259470 A1 | 10/2009 | Chang |
| 2009/0259560 A1 | 10/2009 | Bachenheimer |
| 2009/0259588 A1 | 10/2009 | Lindsay |
| 2009/0259855 A1 | 10/2009 | de Cesare et al. |
| 2009/0261189 A1 | 10/2009 | Ellis, Jr. |
| 2009/0270126 A1 | 10/2009 | Liu |
| 2009/0271265 A1 | 10/2009 | Lay et al. |
| 2009/0271617 A1 | 10/2009 | Song et al. |
| 2009/0272801 A1 | 11/2009 | Connell, II et al. |
| 2009/0276244 A1 | 11/2009 | Baldwin, Jr. et al. |
| 2009/0281945 A1 | 11/2009 | Shakkarwar |
| 2009/0281951 A1 | 11/2009 | Shakkarwar |
| 2009/0289110 A1 | 11/2009 | Regen et al. |
| 2009/0300066 A1 | 12/2009 | Guo et al. |
| 2009/0307778 A1 | 12/2009 | Mardikar |
| 2009/0326972 A1 | 12/2009 | Washington |
| 2009/0328173 A1 | 12/2009 | Jakobson et al. |
| 2010/0024037 A1 | 1/2010 | Grzymala-Busse et al. |
| 2010/0030677 A1 | 2/2010 | Melik-Aslanian et al. |
| 2010/0031030 A1 | 2/2010 | Kao et al. |
| 2010/0037147 A1 | 2/2010 | Champion et al. |
| 2010/0037308 A1 | 2/2010 | Lin et al. |
| 2010/0042526 A1 | 2/2010 | Martinov |
| 2010/0043055 A1 | 2/2010 | Baumgart |
| 2010/0070620 A1 | 3/2010 | Awadallah et al. |
| 2010/0077006 A1 | 3/2010 | El Emam et al. |
| 2010/0085146 A1 | 4/2010 | Johnson |
| 2010/0088233 A1 | 4/2010 | Tattan et al. |
| 2010/0088338 A1 | 4/2010 | Pavoni, Jr. et al. |
| 2010/0094664 A1 | 4/2010 | Bush et al. |
| 2010/0094767 A1 | 4/2010 | Miltonberger |

(56) References Cited

U.S. PATENT DOCUMENTS

| | | |
|---|---|---|
| 2010/0094768 A1 | 4/2010 | Miltonberger |
| 2010/0094910 A1 | 4/2010 | Bayliss |
| 2010/0095357 A1 | 4/2010 | Willis et al. |
| 2010/0100406 A1 | 4/2010 | Lim |
| 2010/0100945 A1 | 4/2010 | Ozzie et al. |
| 2010/0107225 A1 | 4/2010 | Spencer et al. |
| 2010/0114724 A1 | 5/2010 | Ghosh et al. |
| 2010/0114744 A1 | 5/2010 | Gonen |
| 2010/0121767 A1 | 5/2010 | Coulter et al. |
| 2010/0130172 A1 | 5/2010 | Vendrow et al. |
| 2010/0131273 A1 | 5/2010 | Aley-Raz et al. |
| 2010/0132043 A1 | 5/2010 | Bjorn et al. |
| 2010/0145836 A1 | 6/2010 | Baker et al. |
| 2010/0158207 A1 | 6/2010 | Dhawan et al. |
| 2010/0169210 A1 | 7/2010 | Bous et al. |
| 2010/0169947 A1 | 7/2010 | Sarmah et al. |
| 2010/0188684 A1 | 7/2010 | Kumara |
| 2010/0205662 A1 | 8/2010 | Ibrahim et al. |
| 2010/0217837 A1 | 8/2010 | Ansari et al. |
| 2010/0218255 A1 | 8/2010 | Ritman et al. |
| 2010/0228649 A1 | 9/2010 | Pettitt |
| 2010/0228657 A1 | 9/2010 | Kagarlis |
| 2010/0229225 A1 | 9/2010 | Sarmah et al. |
| 2010/0229230 A1 | 9/2010 | Edeki et al. |
| 2010/0229245 A1 | 9/2010 | Singhal |
| 2010/0241501 A1 | 9/2010 | Marshall |
| 2010/0250364 A1 | 9/2010 | Song et al. |
| 2010/0250411 A1 | 9/2010 | Ogrodski |
| 2010/0250509 A1 | 9/2010 | Andersen |
| 2010/0250955 A1 | 9/2010 | Trevithick et al. |
| 2010/0268557 A1 | 10/2010 | Faith et al. |
| 2010/0274679 A1 | 10/2010 | Hammad |
| 2010/0275265 A1 | 10/2010 | Fiske et al. |
| 2010/0293090 A1 | 11/2010 | Domenikos et al. |
| 2010/0293114 A1 | 11/2010 | Khan et al. |
| 2010/0302157 A1 | 12/2010 | Zilberman |
| 2010/0306101 A1 | 12/2010 | Lefner et al. |
| 2010/0313273 A1 | 12/2010 | Freas |
| 2010/0325035 A1 | 12/2010 | Hilgers et al. |
| 2010/0325442 A1 | 12/2010 | Petrone et al. |
| 2010/0332292 A1 | 12/2010 | Anderson |
| 2010/0332362 A1 | 12/2010 | Ramsey et al. |
| 2011/0004498 A1 | 1/2011 | Readshaw |
| 2011/0016042 A1 | 1/2011 | Cho et al. |
| 2011/0040983 A1 | 2/2011 | Grzymala-Busse et al. |
| 2011/0047071 A1 | 2/2011 | Choudhuri et al. |
| 2011/0066547 A1 | 3/2011 | Clark et al. |
| 2011/0082768 A1 | 4/2011 | Eisen |
| 2011/0093383 A1 | 4/2011 | Haggerty et al. |
| 2011/0112958 A1 | 5/2011 | Haggerty et al. |
| 2011/0119291 A1 | 5/2011 | Rice |
| 2011/0126024 A1 | 5/2011 | Beatson et al. |
| 2011/0126275 A1 | 5/2011 | Anderson et al. |
| 2011/0145899 A1 | 6/2011 | Cao et al. |
| 2011/0166988 A1 | 7/2011 | Coulter |
| 2011/0184838 A1 | 7/2011 | Winters et al. |
| 2011/0184851 A1 | 7/2011 | Megdal et al. |
| 2011/0196791 A1 | 8/2011 | Dominguez |
| 2011/0238566 A1 | 9/2011 | Santos |
| 2011/0260832 A1 | 10/2011 | Ross et al. |
| 2011/0276496 A1 | 11/2011 | Neville et al. |
| 2011/0282778 A1 | 11/2011 | Wright et al. |
| 2011/0289032 A1 | 11/2011 | Crooks et al. |
| 2011/0289322 A1 | 11/2011 | Rasti |
| 2011/0295721 A1 | 12/2011 | MacDonald |
| 2011/0295750 A1 | 12/2011 | Rammal |
| 2011/0296529 A1 | 12/2011 | Bhanoo et al. |
| 2011/0302412 A1 | 12/2011 | Deng et al. |
| 2011/0302641 A1 | 12/2011 | Hald et al. |
| 2012/0030080 A1 | 2/2012 | Slater et al. |
| 2012/0030083 A1 | 2/2012 | Newman et al. |
| 2012/0030771 A1 | 2/2012 | Pierson et al. |
| 2012/0066073 A1 | 3/2012 | Dilip et al. |
| 2012/0101939 A1 | 4/2012 | Kasower |
| 2012/0158574 A1 | 6/2012 | Brunzell et al. |
| 2012/0158654 A1 | 6/2012 | Behren et al. |
| 2012/0198556 A1 | 8/2012 | Patel et al. |
| 2012/0215682 A1 | 8/2012 | Lent et al. |
| 2012/0278227 A1 | 11/2012 | Kolo et al. |
| 2012/0290660 A1 | 11/2012 | Rao et al. |
| 2013/0004033 A1 | 1/2013 | Trugenberger et al. |
| 2013/0185293 A1 | 7/2013 | Boback |
| 2013/0218797 A1 | 8/2013 | Prichard et al. |
| 2014/0007238 A1 | 1/2014 | Magee et al. |
| 2014/0058910 A1 | 2/2014 | Abeles |
| 2014/0149304 A1 | 5/2014 | Bucholz et al. |
| 2014/0214636 A1* | 7/2014 | Rajsky ............... G06Q 40/123 705/31 |
| 2015/0186901 A1 | 7/2015 | Miltonberger |
| 2015/0199784 A1 | 7/2015 | Straub et al. |
| 2015/0295924 A1 | 10/2015 | Gottschalk, Jr. |
| 2016/0012561 A1 | 1/2016 | Lappenbusch et al. |
| 2016/0063645 A1* | 3/2016 | Houseworth ........ G06Q 50/265 705/31 |
| 2016/0071208 A1 | 3/2016 | Straub et al. |
| 2016/0086262 A1 | 3/2016 | Straub et al. |
| 2016/0328814 A1 | 11/2016 | Prichard et al. |
| 2016/0344758 A1 | 11/2016 | Cohen et al. |
| 2017/0053369 A1 | 2/2017 | Gottschalk, Jr. et al. |
| 2017/0099314 A1 | 4/2017 | Klatt et al. |
| 2017/0270629 A1* | 9/2017 | Fitzgerald ............ G06Q 40/123 |
| 2017/0278182 A1 | 9/2017 | Kasower |
| 2017/0287065 A1 | 10/2017 | Samler et al. |
| 2017/0374076 A1 | 12/2017 | Pierson et al. |
| 2018/0130157 A1 | 5/2018 | Gottschalk, Jr. et al. |
| 2018/0322572 A1 | 11/2018 | Straub et al. |
| 2019/0311366 A1 | 10/2019 | Zoldi et al. |
| 2019/0377896 A1 | 12/2019 | Spinelli et al. |
| 2020/0134629 A1 | 4/2020 | Zoldi et al. |
| 2020/0145436 A1 | 5/2020 | Brown et al. |
| 2020/0151628 A1 | 5/2020 | Zoldi et al. |

FOREIGN PATENT DOCUMENTS

| | | |
|---|---|---|
| EP | 0 554 083 | 8/1993 |
| EP | 2 939 361 | 10/2019 |
| GB | 2 392 748 | 3/2004 |
| GB | 2 518 099 | 3/2015 |
| JP | 2011-134252 | 7/2011 |
| JP | 5191376 | 5/2013 |
| KR | 10-2004-0034063 | 4/2004 |
| TW | 256569 | 6/2006 |
| WO | WO 94/006103 | 3/1994 |
| WO | WO 96/041488 | 12/1996 |
| WO | WO 00/055778 | 9/2000 |
| WO | WO 00/055789 | 9/2000 |
| WO | WO 00/055790 | 9/2000 |
| WO | WO 01/011522 | 2/2001 |
| WO | WO 02/027610 | 4/2002 |
| WO | WO 02/097563 | 12/2002 |
| WO | WO 03/071388 | 8/2003 |
| WO | WO 02/037219 A9 | 5/2004 |
| WO | WO 2004/046882 | 6/2004 |
| WO | WO 2006/069199 | 6/2006 |
| WO | WO 2007/001394 | 1/2007 |
| WO | WO 2007/106393 | 9/2007 |
| WO | WO 2008/054403 | 5/2008 |
| WO | WO 2008/054849 | 5/2008 |
| WO | WO 2008/147918 | 12/2008 |
| WO | WO 2009/062111 | 5/2009 |
| WO | WO 2009/117518 | 9/2009 |
| WO | WO 2011/044036 | 4/2011 |
| WO | WO 2012/054646 | 4/2012 |
| WO | WO 2012/112781 | 8/2012 |
| WO | WO 2013/026343 | 2/2013 |
| WO | WO 2013/126281 | 8/2013 |
| WO | WO 2014/008079 | 1/2014 |
| WO | WO 2014/008247 | 1/2014 |
| WO | WO 2014/150987 | 9/2014 |
| WO | WO 2018/175440 | 9/2018 |

(56) References Cited

FOREIGN PATENT DOCUMENTS

WO  WO 2018/208770  11/2018
WO  WO 2019/006272  1/2019

OTHER PUBLICATIONS

Official Communication in Australian Patent Application No. 2017203586, dated Jun. 18, 2019.
U.S. Appl. No. 09/557,252, filed Apr. 24, 2000, Page.
U.S. Appl. No. 12/705,489, filed Feb. 12, 2010, Bargoli et al.
U.S. Appl. No. 12/705,511, filed Feb. 12, 2010, Bargoli et al.
"A New Approach to Fraud Solutions", BasePoint Science Solving Fraud, pp. 8, 2006.
AAD et al., "NRC Data Collection and the Privacy by Design Principles", IEEE, Nov. 2010, pp. 5.
"Arizona Company Has Found Key in Stopping ID Theft," PR Newswire, New York, Aug. 10, 2005 http://proquest.umi.com/pqdweb?did=880104711&sid=1&Fmt=3&clientId=19649&RQT=309&Vname=PQD.
ABC News Now: Money Matters, as broadcasted Nov. 15, 2005 with guest Todd Davis (CEO of Lifelock), pp. 6.
Anonymous, "Feedback", Credit Management, ABI/INFORM Global, Sep. 2006, pp. 6.
"Beverly Hills Man Convicted of Operating 'Bust-Out' Schemes that Caused More than $8 Million in Losses", Department of Justice, Jul. 25, 2006, 2 Pgs.
Bielski, Lauren, "Will you Spend to Thwart ID Theft?" ABA Banking Journal, Apr. 2005, pp. 54, 56-57, 60.
BlueCava, "What We Do", http://www.bluecava.com/what-we-do/, printed Nov. 5, 2012 in 3 pages.
"Bust-Out Schemes", Visual Analytics Inc. Technical Product Support, Newsletter vol. 4, Issue 1, Jan. 2005, pp. 7.
Chores & Allowances, "Do Kids Have Credit Reports?" Oct. 15, 2007, http://choresandallowances.blogspot.com/2007/10/do-kids-have-credit-reports.html, pp. 5.
Cowie, Norman, "Warning Bells & 'The Bust-Out'", Business Credit, Jul. 1, 2000, pp. 5.
Cullen, Terri; "The Wall Street Journal Complete Identity Theft Guidebook:How to Protect Yourself from the Most Pervasive Crime in America"; Chapter 3, pp. 59-79; Jul. 10, 2007.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning:Tech Talk; pp. 36-38; Sep. 2004.
eFunds Corporation, "Data & Decisioning: Debit Report" printed Apr. 1, 2007, http://www.efunds.com/web/industry-solutions/financial-services/frm-debit-report/htm in 1 page.
Equifax; "Equifax Credit Watch"; https://www.econsumer.equifax.co.uk/consumer/uk/sitepage.ehtml, dated Jun. 27, 2007 on www.archive.org.
Experian Team, "Impact on Credit Scores of Inquiries for an Auto Loan," Ask Experian, Mar. 1, 2009, pp. 5.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
"Fighting the New Face of Fraud", FinanceTech, http://www.financetech.com/showArticle.jhtml?articleID=167100405, Aug. 2, 2005.
"FinExtra, Basepoint Analytics Introduces Predictive Technology for Mortgage Fraud", Oct. 5, 2005, pp. 3.

Fisher, Joseph, "Access to Fair Credit Reports: Current Practices and Proposed Legislation," American Business Law Journal, Fall 1981, vol. 19, No. 3, p. 319.
"Fraud Alert | Learn How". Fight Identity Theft. http://www.fightidentitytheft.com/flag.html, accessed on Nov. 5, 2009.
GIBBS, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Identity Fraud: A Critical National and Global Threat," LexisNexis, Oct. 28, 2003, pp. 1-48.
Haglund, Christoffer, "Two-Factor Authentication With a Mobile Phone", Fox Technologies, Uppsala, Department of Information Technology, Nov. 2, 2007, pp. 62.
Herzberg, Amir, "Payments and Banking with Mobile Personal Devices," Communications of the ACM, May 2003, vol. 46, No. 5, pp. 53-58.
"ID Analytics ID Network", from www.idanalytics.com, as retrieved from www.archive.org, dated Nov. 20, 2005 or earlier; attached as "ID Network (IDNb)", pp. 8.
ID Cops, www.idcops.com; retrieved from www.archive.org any linkage Feb. 16, 2007.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientId=19649&RQT=309&Vname=PQD.
"Industry News, New Technology Identifies Mortgage Fraud: Basepoint Analytics Launches FraudMark", Inman News, American Land Title Association, Oct. 5, 2005, pp. 1.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
"Intersections, Inc. Identity Guard", from www.intersections.com and www.identityguard.com, as retrieved from Internet Archive, dated Nov. 25, 2005 or earlier; attached as "Identity Guard (IDG)", pp. 7.
Iovation, Device Identification & Device Fingerprinting, http://www.iovation.com/risk-management/device-identification printed Nov. 5, 2012 in 6 pages.
Jacob et al., A Case Study of Checking Account Inquiries and Closures in Chicago, The Center for Financial Services Innovation, Nov. 2006.
Karlan et al., "Observing Unobservables:Identifying Information Asymmetries with a Consumer Credit Field Experiment", Jun. 17, 2006, pp. 58, http://aida.econ.yale.edu/karlan/papers/ObservingUnobservables.KarlanZinman.pdf.
Khan, Muhammad Khurram, PhD., "An Efficient and Secure Remote Mutual Authentication Scheme with Smart Cards" IEEE International Symposium on Biometrics & Security Technologies (ISBAST), Apr. 23-24, 2008, pp. 1-6.
Lamons, Bob, "Be Smart: Offer Inquiry Qualification Services," Marketing News, ABI/Inform Global, Nov. 6, 1995, vol. 29, No. 23, pp. 13.
Lee, Timothy B., "How America's Broken Tax System Makes Identity Theft Easy", http://www.vox.com/2014/4/14/5608072/how-americas-broken-tax-system-makes-identity-theft-easy, Apr. 14, 2014, pp. 10.

(56) References Cited

OTHER PUBLICATIONS

Lee, W.A.; "Experian, on Deal Hunt, Nets Identity Theft Insurer", American Banker: The Financial Services Daily, Jun. 4, 2003, New York, NY, 1 page.

Lefebvre et al., "A Robust Soft Hash Algorithm for Digital Image Signature", International Conference on Image Processing 2:11 (ICIP), vol. 3, Oct. 2003, pp. 495-498.

LifeLock, "How LifeLock Works," http://www.lifelock.com/lifelock-for-people printed Mar. 14, 2008 in 1 page.

LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.

LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.

LifeLock, "Personal Identity Theft Protection & Identity Theft Products," http://www.lifelock.com/lifelock-for-people, accessed Nov. 5, 2007.

LifeLock, Various Pages, www.lifelock.com/, 2007.

My Call Credit http://www.mycallcredit.com/products.asp?product=ALR dated Dec. 10, 2005 on www.archive.org.

My Call Credit http://www.mycallcredit.com/rewrite.asp?display=faq dated Dec. 10, 2005 on www.archive.org.

MyReceipts, http://www.myreceipts.com/, printed Oct. 16, 2012 in 1 page.

MyReceipts—How it Works, http://www.myreceipts.com/howItWorks.do, printed Oct. 16, 2012 in 1 page.

National Alert Registry Launches RegisteredOffendersList.org to Provide Information on Registered Sex Offenders, May 16, 2005, pp. 2, http://www.prweb.com/printer/240437.htm accessed on Oct. 18, 2011.

National Alert Registry Offers Free Child Safety "Safe From Harm" DVD and Child Identification Kit, Oct. 24, 2006. pp. 2, http://www.prleap.com/pr/53170 accessed on Oct. 18, 2011.

National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.

OGG, Erica, "Apple Cracks Down on UDID Use", http://gigaom.com/apple/apple-cracks-down-on-udid-use/ printed Nov. 5, 2012 in 5 Pages.

Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages Pagano, et al., "Information Sharing in Credit Markets," Dec. 1993, The Journal of Finance, vol. 48, No. 5, pp. 1693-1718.

Partnoy, Frank, Rethinking Regulation of Credit Rating Agencies: An Institutional Investor Perspective, Council of Institutional Investors, Apr. 2009, pp. 21.

Planet Receipt—Home, http://www.planetreceipt.com/home printed Oct. 16, 2012 in 1 page.

Planet Receipt—Solutions & Features, http://www.planetreceipt.com/solutions-features printed Oct. 16, 2012 in 2 pages.

Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.

Privacy Rights Clearinghouse, "Identity Theft: What to do if it Happens to You," http://web.archive.org/web/19990218180542/http://privacyrights.org/fs/fs17a.htm printed Feb. 18, 1999.

Quinn, Tom, "Low Credit Inquiries Affect Your Credit Score", Credit.com, May 2, 2011, pp. 2.

Rivera, Barbara, "New Tools for Combating Income Tax Refund Fraud", https://gcn.com/Articles/2014/05/08/Insight-tax-fraud-tools.aspx?Page=1, May 8, 2014, pp. 3.

Scholastic Inc.:Parent's Request for Information http://web.archive.org/web/20070210091055/http://www.scholastic.com/inforequest/index.htm as archived Feb. 10, 2007 in 1 page.

Scholastic Inc.:Privacy Policy http://web.archive.org/web/20070127214753/http://www.scholastic.com/privacy.htm as archived Jan. 27, 2007 in 3 pages.

ShoeBoxed, https://www.shoeboxed.com/sbx-home/ printed Oct. 16, 2012 in 4 pages.

Singletary, Michelle, "The Littlest Victims of ID Theft", The Washington Post, The Color of Money, Oct. 4, 2007.

Sumner, Anthony, "Tackling the Issue of Bust-Out Fraud", Retail Banker International, Jul. 24, 2007, pp. 4.

Sumner, Anthony, "Tackling the Issue of Bust-Out Fraud", Experian: Decision Analytics, Dec. 18, 2007, pp. 24.

Sumner, Anthony, "Tackling the Issue of Bust-Out Fraud", e-News, Experian: Decision Analytics, pp. 4, [Originally Published in Retail Banker International Magazine Jul. 24, 2007].

TheMorningCall.Com, "Cheap Ways to Foil Identity Theft," www.mcall.com/business/columnists/all-karp.5920748jul01,0 . . . , published Jul. 1, 2007.

"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.

Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.

Vamosi, Robert, "How to Handle ID Fraud's Youngest Victims," Nov. 21, 2008, http://news.cnet.com/8301-10789_3-10105303-57.html.

Webpage printed out from http://www.jpmorgan.com/cm/ContentServer?c=TS_Content&pagename=jpmorgan%2fts%2FTS_Content%2FGeneral&cid=1139403950394 on Mar. 20, 2008, Feb. 13, 2006, New York, NY.

Wilson, Andrea, "Escaping the Alcatraz of Collections and Charge-Offs", http://www.transactionworld.net/articles/2003/october/riskMgmt1.asp, Oct. 2003.

International Search Report and Written Opinion for Application No. PCT/US2007/06070, dated Nov. 10, 2008.

International Search Report and Written Opinion for Application No. PCT/US2008/064594, dated Oct. 30, 2008.

International Preliminary Report and Written Opinion in PCT/US2008/064594, dated Dec. 10, 2009.

International Search Report and Written Opinion for Application No. PCT/US09/37565, dated May 12, 2009.

Official Communication in Australian Patent Application No. 2012217565, dated May 12, 2017.

Official Communication in Canadian Patent Application No. 2,827,478, dated Jun. 29, 2017.

Official Communication in Canadian Patent Application No. 2,827,478, dated May 31, 2018.

Extended European Search Report for Application No. EP12747205, dated Sep. 25, 2014.

Supplementary European Search Report for Application No. EP12747205, dated Jun. 19, 2015.

International Search Report and Written Opinion for Application No. PCT/US2012/025456, dated May 21, 2012.

International Preliminary Report on Patentability in Application No. PCT/US2012/025456, dated Aug. 21, 2013.

International Search Report and Written Opinion for Application No. PCT/US2011/033940, dated Aug. 22, 2011.

Extended European Search Report for Application No. EP18207755, dated Dec. 13, 2018.

Official Communication in Canadian Patent Application No. 2,827,478, dated Mar. 27, 2019.

Official Communication in Australian Patent Application No. 2019279982, dated Dec. 19, 2019.

\* cited by examiner

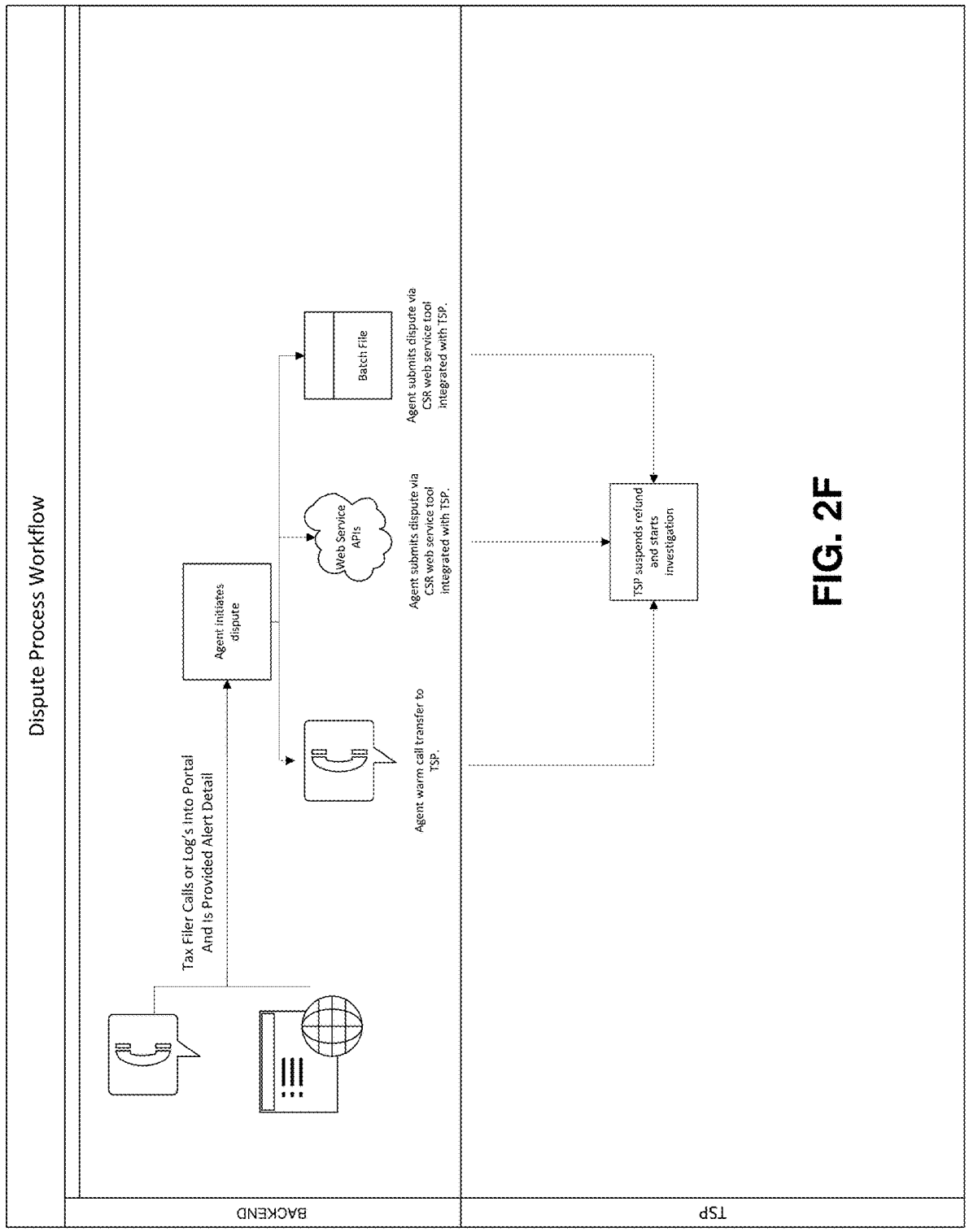

SECURITY AND IDENTITY VERIFICATION SYSTEM AND ARCHITECTURE

CROSS-REFERENCE AND PRIORITY

This application claims the benefit of priority of U.S. Provisional Patent Application Ser. No. 62/586,014, filed Nov. 14, 2017, the entirety of which is hereby incorporated herein by reference for all purposes.

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

FIELD OF THE DISCLOSURE

The present disclosure generally relates to information security for tax filings in a computer environment.

BACKGROUND OF THE DISCLOSURE

In recent years, the number of third party, unwanted intrusions into private computing environments has continued to increase. These intrusions may come in a variety of forms, such as malicious third party systems attempting to emulate or impersonate the systems of a standard user. Such intrusions can be very disruptive and may, for example, immobilize operations, allow for the unauthorized access to sensitive data, or allow for the embezzlement of a user's account and corresponding funds.

SUMMARY OF EXAMPLE EMBODIMENTS

Various systems and methods are disclosed which include features relating to security and identity verification systems and architectures to analyze and detect unauthorized third party intrusions and/or access.

The systems, methods, and devices of the disclosure each have several innovative aspects, no single one of which is solely responsible for the desirable attributes disclosed herein.

In one embodiment, a fraud detection and alert system is disclosed. The fraud detection and alert system may comprise: one or more data stores configured to store computer-executable instructions; a network interface configured to communicate with a plurality of network service devices; and one or more physical computer processors in communication with the one or more data stores, wherein the computer-executable instructions, when executed, configure the one or more processors to: receive, via the network interface, an electronic request for a filing of an application, wherein the electronic request is associated with a first user and includes user data associated with the first user; match, based on the electronic request, the user data associated with the first user to verification data stored in one or more searchable databases, wherein the verification data is associated with the first user; transmit notification to first user device associated with the first user regarding the successful application filing of the first user's application; receive an indication from the first user device indicating a possible fraudulent electronic request; determine, based on the indication, that the electronic request is fraudulent; and generate electronic instructions to stop the filing of the application as requested by the electronic requests.

In another embodiment, a computerized method for detecting fraudulent tax filings is disclosed. The computerized method may comprise: receiving, via a network interface, an electronic request for a filing of an application, wherein the electronic request is associated with a first user and includes user data associated with the first user; matching, based on the electronic request and using one or more computer processors, the user data associated with the first user to verification data stored in one or more searchable databases, wherein the verification data is associated with the first user; transmitting, via one or more computer processors, notification to first user device associated with the first user regarding the successful application filing of the first user's application; receiving, via a network interface, an indication from the first user device indicating a possible fraudulent electronic request; determining, via one or more computer processors, based on the indication, that the electronic request is fraudulent; and generating, via one or more computer processors, electronic instructions to stop the filing of the application as requested by the electronic request.

In a further embodiment, a non-transitory storage medium for storing instructions adapted to be executed by a processor to perform a method for automatically detecting fraudulent tax filings is disclosed. The instructions may comprise: receiving an electronic request for a filing of an application, wherein the electronic request is associated with a first user and includes user data associated with the first user; matching, based on the electronic request, the user data associated with the first user to verification data stored in one or more searchable databases, wherein the verification data is associated with the first user; transmitting notification to first user device associated with the first user regarding the successful application filing of the first user's application; receiving an indication from the first user device indicating a possible fraudulent electronic request; determining based on the indication, that the electronic request is fraudulent; and generating electronic instructions to stop the filing of the application as requested by the electronic request.

Although certain embodiments and examples are disclosed herein, the subject matter extends beyond the examples in the specifically disclosed embodiments to other alternative embodiments and/or uses, and to modifications and equivalents thereof.

BRIEF DESCRIPTION OF THE DRAWINGS

FIGS. 2D-1 and 2D-2 illustrate flow diagrams for embodiments of call center support processes.

FIG. 2F illustrates a flow diagram for embodiments of a dispute process.

Figure 1A:
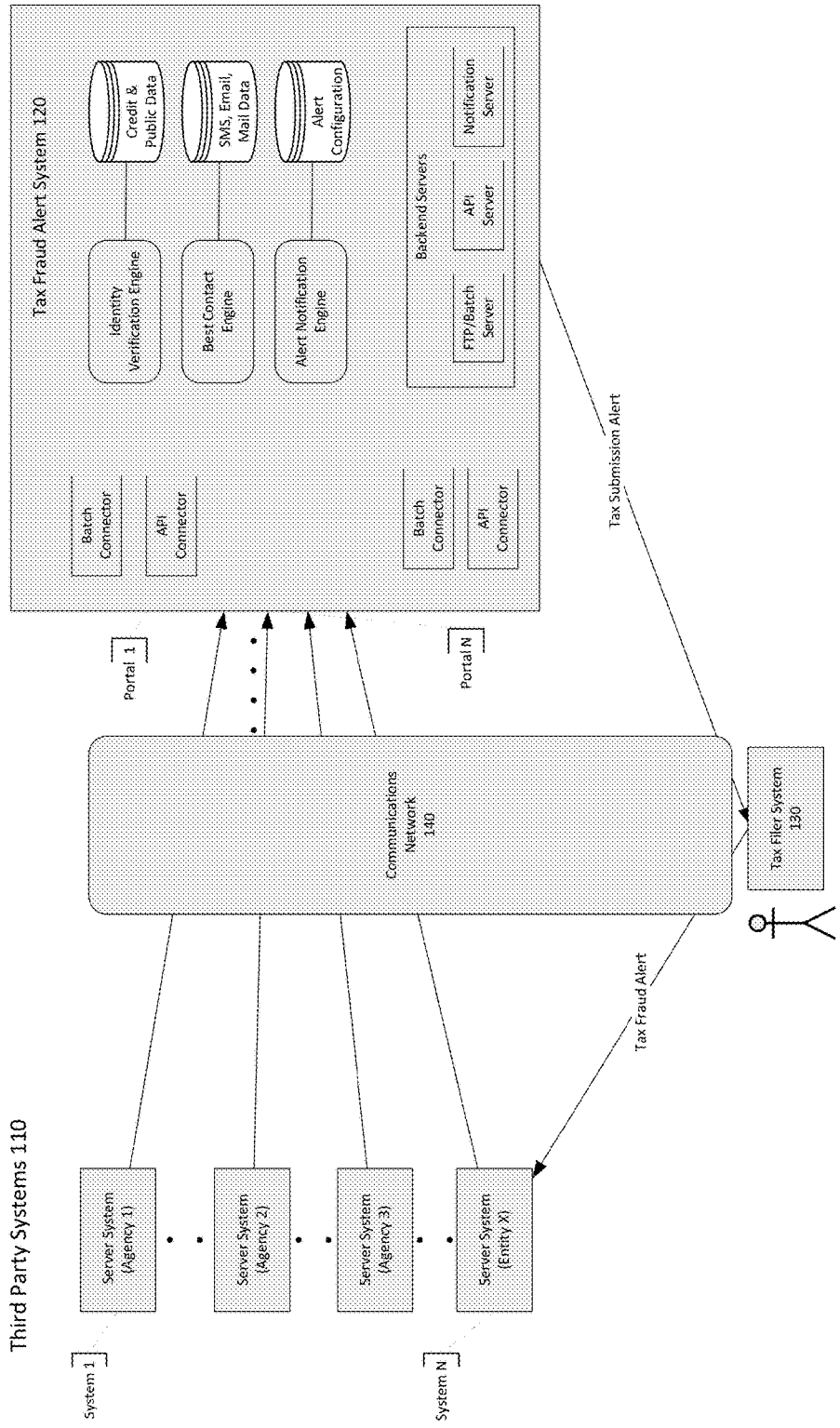
FIG. 1A illustrates example embodiments of a security and identity verification system.

Throughout the drawings, reference numbers are re-used to indicate correspondence between referenced elements. The drawings are provided to illustrate embodiments of the subject matter described herein and not to limit the scope thereof.

Although certain embodiments and examples are disclosed herein, the subject matter extends beyond the examples in the specifically disclosed embodiments to other alternative embodiments and/or uses, and to modifications and equivalents thereof.

DETAILED DESCRIPTION OF VARIOUS EMBODIMENTS

A. Overview

Tax authorities such as a state or federal government continuously combat fraudulent activities such as noncompliance, evasion, identity theft and refund fraud. Unfortunately, despite widespread government crackdowns, fraudsters are finding new and creative ways to defraud the government and legitimate taxpayers. For example, some individuals and groups acquire personally identifiable information (PII) from the deceased, dumpster dive, hack financial systems, buy information from someone not filing a return or otherwise steal it from legitimate sources such as a doctor's office. This PII can then be used to fill out tax returns, add fraudulent income information, and request false deductions.

Fake returns and identity theft cause the government to lose billions of dollars. For example, during the first nine months of 2016, the Federal tax authority flagged roughly 787,000 fake returns claiming $4 billion in refunds, and 237,750 taxpayers filed affidavits saying they, too, were victims of tax identity theft. (See https://www.irs.gov/newsroom/irs-security-summit-partners-expand-identity-theft-safeguards-for-2017-filing-season-build-on-2016-successes). According to a May 2014 Governing Institute research study of 129 state and local government officials, 43 percent of respondents cited identity theft as the biggest challenge their agency faces regarding tax return fraud. Nationwide, stealing identities and filing for tax refunds is one of the fastest-growing nonviolent criminal activities. Although federal agencies and some states have been able to start reducing identity theft tax refund fraud for individuals, tax refund fraud involving businesses is on the rise. These activities burden government agencies and rob taxpayers by preventing returns from reaching the right people. Clearly, tax fraud through identity theft is still a major issue facing the tax authorities and taxpayers.

Most recently in a June 2017 report by the Electronic Tax Administration Advisory Committee (ETAAC) published by the Internal Revenue Service (IRS), Identity Theft Tax Refund Fraud (IDTTRF) was described as a tough problem for tax authorities to solve. The report went further to say that criminals are incentivized by the potential availability of billions of dollars in refunds, particularly driven by refundable tax credits intended to help low and moderate-income Americans. The criminals are smart, nimble, motivated and well-funded.

Tax collection agencies, such as tax authorities at the local, state, and federal level, combined continue to lose billions of dollars in tax refund fraud. Tax service providers (TSPs), such as the tax collection agencies or a private tax preparation organization such as Intuit, H&R Block, or other tax preparation business, are well-aware of the magnitude of the tax fraud problem. However, budgetary constraints and legal mandates have created a system that is often unable to follow up on the red flags until after a refund check has been sent. In addition, the consumer or customers' identities and ability to receive a timely return may be put at risk in the process. Some TSPs continue to expand filters used to detect identity theft tax refund fraud. Tax returns identified by these filters can be held during processing until the TSPs can verify the taxpayers' identities. This filtering approach, however, is problematic because it focuses only on fraud detection rather than proactively informing a tax payer of a tax filing to enable prevention. Further, as tax-refund fraud has soared and hit a whopping $21 billion in 2016, up from just $6.5 billion two years ago, the problem of tax-refund fraud is growing quickly and is compounded by an outdated fraud-detection system that has trouble identifying many attempts to trick it. Although federal agencies and some states have been able to start reducing identity theft tax refund fraud for individuals, tax refund fraud involving businesses is on the rise.

Security practices can have a significant impact on the tax experience and taxpayer behavior. Improving the taxpayer experience may require sustained creativity and focus for a TSP to build systems that are both secure and, conversely, easy to access and use from a taxpayer perspective. A system that is secure, but that few can use, may not be successful for a TSP as it expands some of its key online services. Thus, in some embodiments, a TSP may strive to achieve a situation where services are both secure and easy to use and access. For example, a TSP may benefit from a system that provides more intelligent and customizable fraud detection checks to inform the TSP, before a refund check is processed and mailed out or sent to a direct deposit account, that a tax transaction is at risk of being fraudulent, and/or provides multiple channels to notify their tax payers or customers proactively of both legitimate and fraudulent returns. Further, consumers may also benefit from a system which can: preemptively notify them that tax forms have been filed with their tax identifier (ID) or their business' tax ID regardless of whether they have been flagged as a potential fraudulent tax filing; provide a channel via online or through call centers to contact the IRS or its proxy to remediate the issue if they believe the tax filing is fraudulent; and/or provide a system to track the progress of their cases.

To provide an improved computer system for detecting and alerting tax frauds, embodiments of a security and identity verification system or tax fraud alert system described herein promotes a more proactive and interactive relationship between the taxpayer and government employees to improve taxpayer service, enforcement and operations. Instead of the typical approach of trying to enhance detection of fraudulent tax form submissions, this solution aims to send positive notifications to tax payers when their tax return is filed and/or when any tax form is filed using the tax payers' individual tax ID or business tax ID(s). In some embodiments, the solution can leverage data from one or more credit bureaus and other data sources and algorithms to find good or even the best contact information for a tax payer and send the tax alerts. In some embodiments, the solution can also leverage other software suites and call centers to handle callbacks from users that received a tax alert and suspect fraud or have questions.

As an example, in some embodiments, a portion of the tax fraud alert system can be run at data centers of a tax authority if the tax authority's integration model does not allow non-public personal information (NPPI) data from tax forms to leave their premises, or where the some or all portions of the NPPI data can leave the premise, the system can offer a set of Application Programming Interfaces (APIs)/batch processes to send a subset of NPPI data from tax forms to another entity for the system to determine the correct identity(ies) tied to the individual tax ID or business tax ID in the tax form, selecting contact information to send the tax alert, and/or for handling customer support for those that receive a tax alert. While processing the NPPI submitted, in some embodiments, the system may also perform various types of fraud checks. Some example fraud checks can include: SSN check, multiple submissions to the same address (velocity of the same address being used), multiple submissions to the same bank account, verify against deceased records, communication checks (email, phone numbers, residential address), checking NPPI data in the tax filing against the credit bureau data to look for discrepancies and to verify communication channels, and/or a combination of positive activity tax alerts to all consumers or customers filing taxes and customizable fraud checks.

By notifying the taxpayer that their identity, tax ID, or business tax ID has been used to file a tax form, the consumer can respond to tax authorities and stop the process if they have not submitted a tax form. This proactive communication can prevent loss of tax refunds associated with identity fraud, significantly reduce fraudulent or unauthorized individual or business tax filings whether a refund is involved or not, and alert taxpayers to possible identity theft. In addition, in the June 2017 Electronic Tax Administration Advisory Committee (ETAAC) report published by IRS, the committee cited among its principal recommendations in addressing identity based tax fraud the need to improve authentication practices, including using innovative pilots and finding a replacement solution for the outmoded 2016 AGI/PIN e-file signature verification.

As further described herein, embodiments of the tax fraud alert system can use Personally Identifiable Information (PII) to verify a taxpayer's identity. For example, the PII used on the tax filing can be verified as belonging to the legitimate taxpayer through an independent verification process. Once the legitimate taxpayer is located, the most recent contact information including landline or mobile phone number, mailing address, and/or email associated with the legitimate taxpayer can be sent an alert notifying the taxpayer that a tax return has been filed with the taxpayer's credentials. If the legitimate taxpayer has not submitted a filing, the taxpayer can be provided with an option to contact the tax authority's customer service center or visit a web portal to get more information, and if necessary initiate a dispute and potentially stop payment of any tax refunds tied to the tax filing. The tax fraud alert system can offer a branded call center and/or a branded web portal to handle customers' or tax payers' inquiries about the tax alerts.

In some embodiments, the function of the tax fraud alert system can be twofold—(1) the successful delivery of the tax alert can serve to confirm the legitimate tax payer has filed the return and/or (2) the verification process ensures delivery of alerts to the legitimate taxpayer which results in additional information that can be useful in the overall review of the tax filing. TSP can be provided with a result from the taxpayer verification process, such as, for example, no taxpayer verified through information provided, taxpayer found to be deceased, or taxpayer/location found to be prison. One or more of these results may allow a tax authority to take next steps in the return evaluation process independent of taxpayer response to alerts or content of alerts generated.

Advantageously, in some embodiments, the alert does not add any additional time for processing, but may even shorten the time for processing because if a legitimate taxpayer receives the alert and notifies a tax authority that the taxpayer did not submit the tax filing in question, the tax filing can be sent immediately to fraud prevention for further evaluation. Unlike some existing tax fraud prevention efforts requiring the taxpayer to first obtain a PIN from the TSP to submit it in a tax form, in some embodiments, this tax fraud alert system does not require any taxpayer interaction to be in effect. The legitimate taxpayer does not have to opt-in in order to receive a notification that a tax form has been filed using tax ID or business tax ID that belongs to him or her.

In some embodiments, before sending a taxpayer filing alert, another entity (such as, for example, a credit bureau) can independently verify identity of the taxpayer, and independently locate and verify a mobile phone and/or other contact information associated with the legitimate taxpayer and/or find the best mobile phone number and other contact information. In some embodiments, alerts may only be sent if both the taxpayer and contact information can be verified. If taxpayer receiving the tax alert has submitted a tax form in his or her name or on behalf of a business, then he or she does not have to take any action. The majority of alerts may serve as a notification with no action required. If the taxpayer has not filed any tax form, the taxpayer can be provided with a call center number to contact for remediation efforts. The alerting process, while largely frictionless to the taxpayer, becomes an indispensable, proactive tool in combatting identity theft tax return fraud at the onset.

FIG. 1A illustrates an example embodiment of a security and identity verification system 100 which can be used to provide tax alerts. The exemplary security and identity verification system 100 includes a set of third party systems 110 which communicate with a tax fraud alert system 120 and with tax payer/tax filer systems 130 via a communications network 140. It is recognized that in some fraudulent situations, the tax payer and the tax filer are not the same entity, but the use of the term "tax filer" herein is meant to apply to the tax payer and not a fraudulent tax filer.

The security and identity verification system 100 may include multiple third party system 110 which communicate with the tax fraud alert system 120, such as to submit data, provide information on filed tax returns, and receive alerts for possible tax filing fraud. In some embodiments the third party systems 110 may include TSP systems (for example, systems of the US Federal Government, systems of state governments), third party vendor systems, third party data provider systems, and/or other third party systems. The third party systems 110 may be implemented using a variety of devices including, for example, personal computers, servers, tablets, smart phones, smart watches, car consoles, or the like, alone or in combination. The exemplary third party systems 110 include computer hardware and/or software that allows the devices to communicate with the tax alert fraud system 120 as well as one or more of the tax payer/tax filer systems 130 via the communications network 140. The tax fraud alert systems 120 may include a portal or other software or code that allows the TSP systems 110 to provide configurations for how the respective TSP system 110 would like to configure its alerts. The tax alert fraud systems 120 may be partitioned such that one TSP system 110 and its private configurations are not accessible to or viewable by another TSP system 110.

The security and identity verification system 100 may include multiple tax payer/tax filer systems 130 which are utilized by tax filers to, among other things, provide tax submissions, receive tax alerts, and/or review refund status. The tax payer/tax filer systems 130 may be implemented using a variety of devices including, for example, personal computers, servers, tablets, smart phones, smart watches, car consoles, or the like, alone or in combination. The exemplary tax payer/tax filer systems 130 include computer hardware and/or software that allows the devices to communicate with the tax alert fraud system 120 as well as one or more of the third party systems 110, such as a tax service provider via the communications networks 140. To simplify discussion, but without limiting the present disclosure, FIG. 1 is described herein and illustrates only one tax payer/tax filer systems 130.

In some embodiments, the communications network 140 comprises one or more of local area network (LAN), wide area network (WAN), and/or the Internet, for example, via a wired, wireless, or combination of wired and wireless communication links. The communications network 140 may communicate with various computing devices and/or other electronic devices via wired or wireless communication links. The communications network 140 may be used to share resources and may be used for the analog and/or digital transfer of data and information. In some embodiments, the communications network 140 can be used to enable multiple devices access to a single system, enable file sharing across the communications network 140, share software programs on remote systems, or make information easier to access and maintain among network users.

It is recognized that the term "remote" may include data, objects, devices, components, and/or modules not stored locally, that are not accessible via the local bus. Thus, remote devices may include a device which is physically stored in the same room and connected to the user's device via a network. In other situations, a remote device may be located in a separate geographic area, such as, for example, in a different location, country, and so forth.

B. Tax Fraud Alert System

Figure 1B:
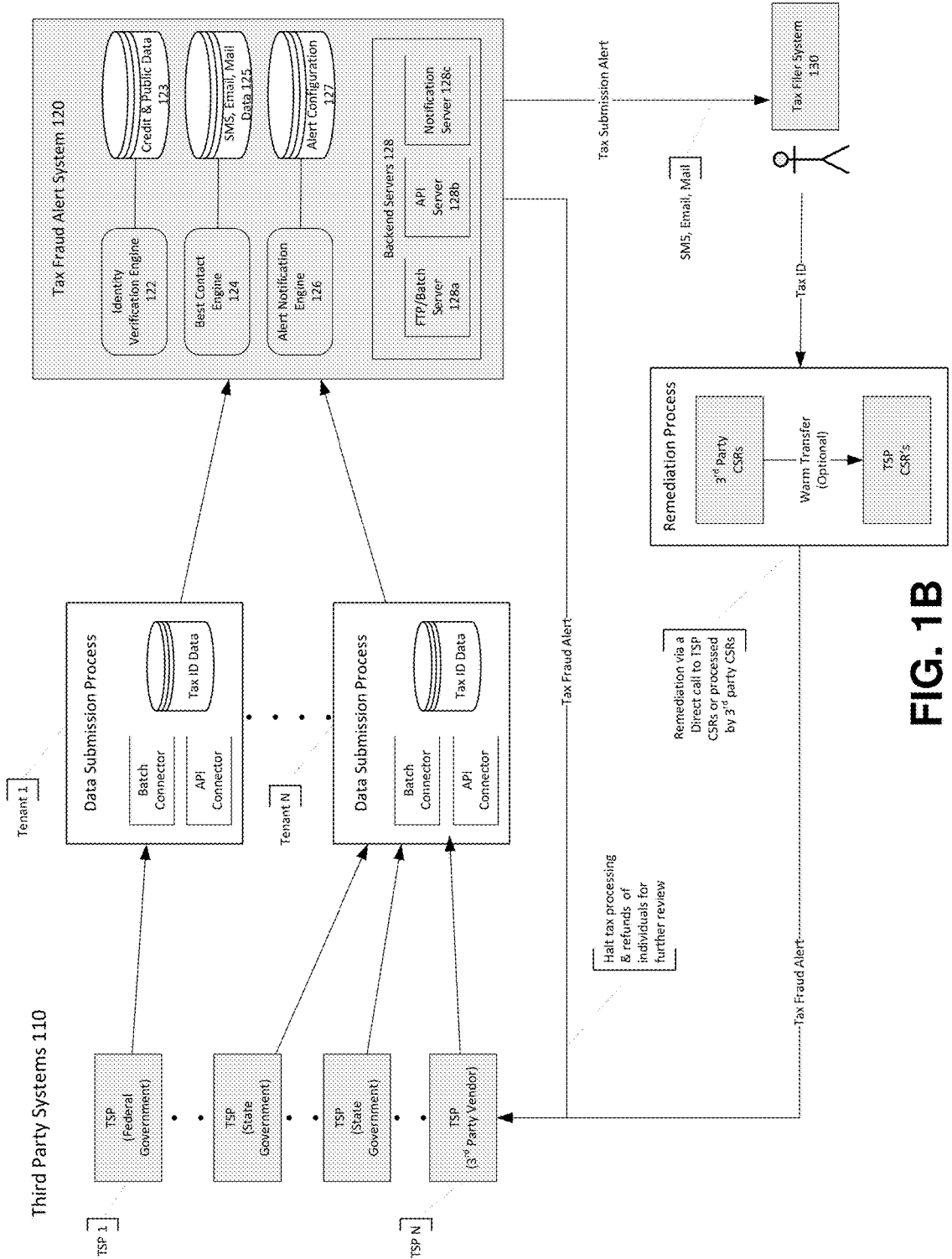
FIG. 1B illustrates example embodiments of a tax fraud alert system.
Figures 1, 1C:
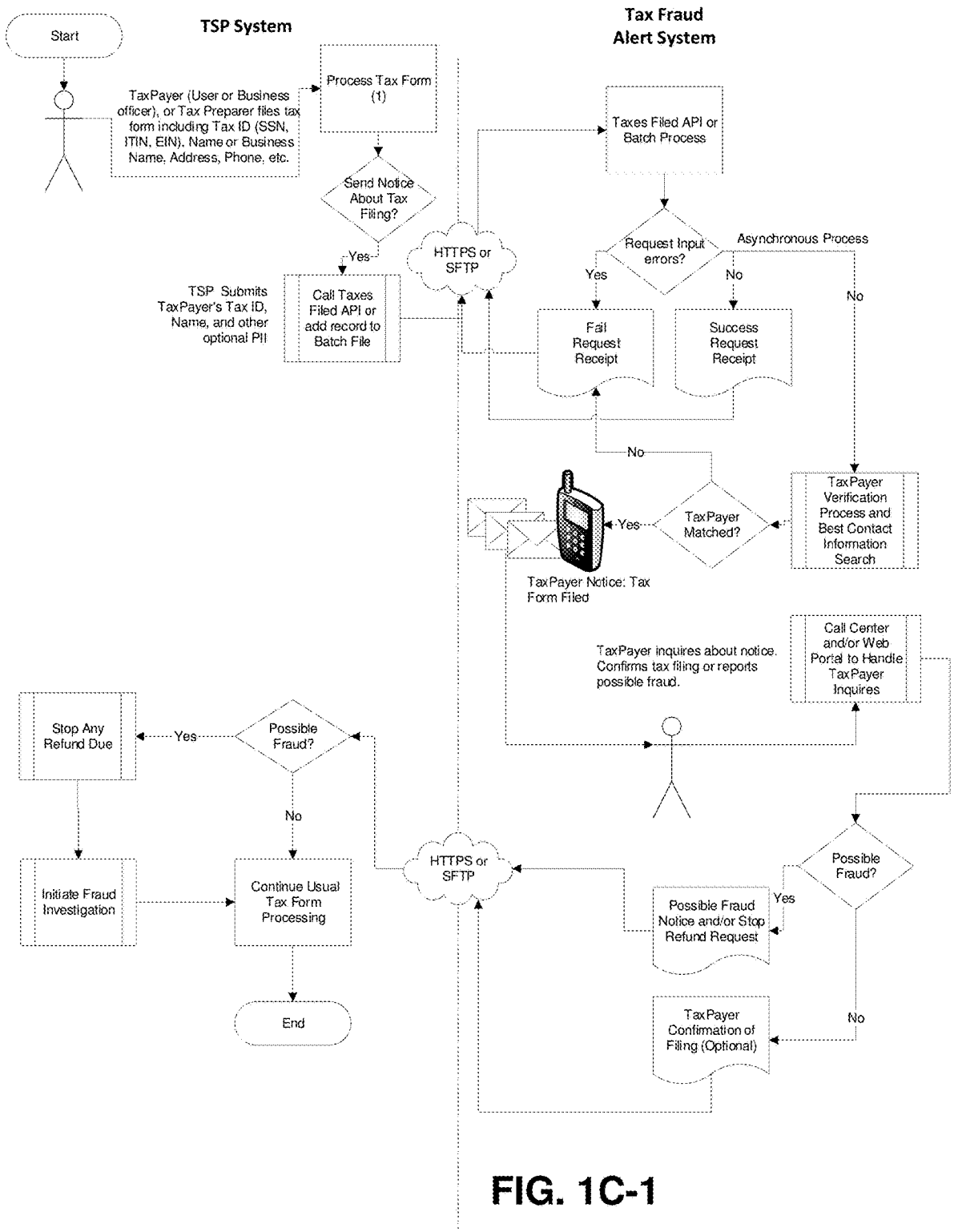
FIGS. 1C-1, 1C-2, 1D, and 1E illustrate example processes that can be implemented by embodiments of one or more components of the tax fraud alert system.

FIG. 1B illustrates an example embodiment of a tax fraud alert system 120. The tax fraud alert system 120 comprises a system that provides alerts to tax filers upon a successful filing of a tax form with a TSP. The tax fraud alert system 120 can also provide remediation services in coordination with TSPs in the event a fraudulent form is filed; and/or validate tax identity information and the corresponding good or best tax filer contact information in order to notify the tax filer in a timely manner. This can be a multi-tenant system in which multiple TSPs are supported by the data submission process each with their own defined configuration of the type of Tax ID information (SSN, name, address, and so on) that is submitted to the tax fraud alert system 120. Each TSP may utilize one or more of the batch connectors or API connectors available in the tax fraud alert system 120 to submit data to the tax fraud alert system 120.

In some embodiments, the tax fraud alert system 120 can include three sub-systems in FIG. 1B: (1) Identity Verification Engine (IVE) 122, (2) Best Contact Engine (BCE) 124, and (3) Alert Notification Engine (ANE) 126, with each engine having its own configuration database to support per tenant business rules. In some embodiments, the IVE 122 and BCE 124 may be optional per tenant, and the data submitted is allowed to bypass these engines and go straight to the ANE 126 to notify tax filers. The IVE 122 can include a configurable rules engine to review incoming data submission to validate and select the best or close matches to the true identity using the combination of data attributes (for example, social security number, name, and address) with known proprietary and public datasets. The BCE 124 can also include a configurable rules engine that reviews incoming data attributes along with data attributes from proprietary and public records to determine at least one valid communication channel (for example, as many valid communication channels as possible, one communication channel, X communication channels) that can be linked to the legitimate tax filer.

In some embodiments, the output of the tax fraud alert system 120 can include one or more of the following options. The first option may include a tax alert to each tax filer based on the results of the IVE 122 and/or the BCE 124. The second option may include a tax alert to identity submitted in the original tax form if the optional IVE 122 and BCE 124 processes were not chosen or if the IVE 122 and/or the BCE 124 were unable to verify a different identity or different contact information than what was submitted in the tax form. This option can still be useful to stop cases where the thief uses the correct information of the tax filer and only changes the account information to be used for tax refunds. The TSP may also use this option to test the notification process and the remediation process for users that receive the notifications. The third option may include a tax fraud alert to the associated TSP with all records that have been flagged by the IVE 122 and the BCE 124. This option can be used by the TSP to initiate fraud investigations on flagged records.

Upon receipt of the tax alert via SMS, email, and/or direct mail, in some embodiments the tax filer may be given detailed instructions on whom to contact to remediate the issue in the event the tax filers believe a tax form was fraudulently filed in the tax filer's name or the name of the tax filer's business. In some embodiments, the tax filer may be automatically redirected to a remediation server which can provide automated remediation processes to assist the tax filer. During this remediation process, in some embodiments, a tax fraud alert can be sent to the associated TSP to halt any tax refund in process and to initiate a fraud review of the tax form, such as via a warm transfer or other transfer or data.

In some embodiments, the tax alert comprises one or more encrypted data packets which stores information about the tax alert and is configured to be sent over an electronic communications network, such as the Internet.

C. Tax Fraud Alert System Processes

FIGS. 1C-1, 1C-2, 1D, and 1E illustrate example processes that can be implemented by embodiments of one or more components of the tax fraud alert system 120.

Figures 1, 1C, 2:
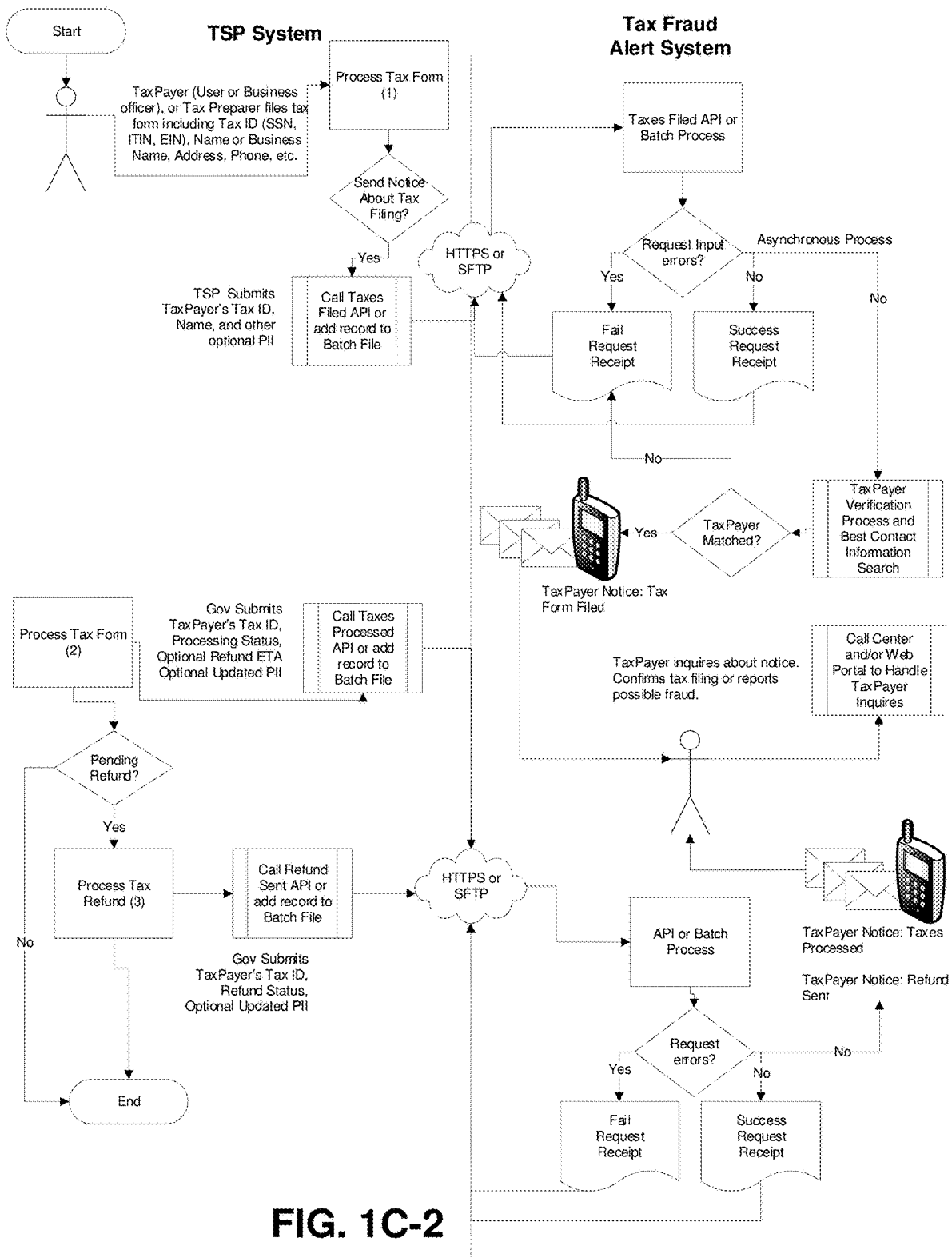

For example, in FIGS. 1C-1 and 1C-2, a TSP system 110 (for example, a government entity server) can submit user's PII to a security platform or backend system (which may implement the tax fraud alert system 120 shown in FIG. 1B). The backend system can process the PII to identify a correct tax payer and send an alert to the tax payer. The backend system can also include a remediation center such as, for example, a call center or a web portal which can receive reports from tax filers regarding possible fraud or receive confirmations of tax filings from the tax filers who received an alert from that tax fraud alert system 120 as shown in FIG. 1C-1.

In some embodiments, the security platform or backend system (for example a tax notification system) can send the taxpayer other notices throughout the tax processing life cycle if a TSP selects this notification option. For example, as illustrated in FIG. 1C-2, the notices may be available for when tax is filed, and then later, when the tax processing is completed. The notices can also include the results from various stages of the tax processing life cycle. For example, results could be success or additional info needed, or an audit notice, or expect a refund in N days, or a tax refund was sent, and so forth.

1. Tax Alert Processes—First Example

FIG. 1C-1 illustrates embodiments of a tax alert process. In the illustrated embodiments, starting at (1) the tax payer (whether a user or business representative) or tax preparer files a tax form with a TSP system 110 which may include tax ID (such as, for example, social security number (SSN), individual tax payer identification number (ITIN), US government issued identifier (EIN), or other identifier), name or business name, address, phone number, and so forth. The TSP system 110 may then being processing the tax form. If there is an indication that the TSP system 110 should send a notice or alert about the tax filing to indicate that a tax filing has been submitted, then the TSP system 110 may make a call to the tax fraud alert system 120, such as, for example via an application programming interface (API) or by adding the tax payer's record to a batch file for processing. The communication may be made via a secure communication protocol, such as, for example, hypertext transfer protocol secure (HTTPS), secure file transfer protocol (SFTP), or another secure protocol. The indication may be based on the tax payer requesting a notification and/or the TSP or other system indicating that the tax payer should receive a notification.

The tax fraud alert system 120 may receive the tax filing data via the API or the batch process. If the TSP has requested notification of such errors, the tax fraud alert system 120 may send a notice to the TSP system indicating that there are and/or are not any input errors. This notice may include the information on one or more tax payer files. If there are no errors, the tax fraud alert system 120 may perform a verification process, such as, for example, the identity verification process described in FIG. 2A. The tax fraud alert system 120 may also perform a contact process, such as, for example, the best contact process described in FIG. 2B. If the tax payer is not matched, the tax fraud alert system 120 may determine whether to send a fail request receipt. If the tax payer is matches, then the tax fraud alert system 120 may generate and send a notification or alert to the tax payer using one or more of the contact channels determined by the contact process, for example using the alert notification process described in FIG. 2C. The tax payer may inquire about the notice and/or confirm whether the tax filing was correct or indicate possible fraud. The tax fraud alert system 120 may include a call center system or web portal to handle the tax payer inquiries and/or provide the tax payer access to a remote call center system or web portal which handles such inquiries.

The tax fraud alert system 120 and/or the remote call center system or portal, may generate and send an electronic notification indicating whether there is possible fraud associated with the tax payer's corresponding filing. If so, then the tax fraud alert system 120 may generate and send a notification to the TSP system 110 that the tax payer has confirmed the filing. If not, then the tax fraud alert system 120 may generate and send a notification to the TSP system 110 a possible fraud notice. In some embodiments, such notice may include instructions or an indication that is used by the TSP to stop or cancel a refund request. Such notifications may be sent to the TSP system 110 via a secure protocol, such as, for example, HTTPS, SFTP, or another secure protocol.

The TSP system 110 receives the notification and determine whether there is possible fraud using the notification. If so, the TSP system 110 may generate instruction to stop or cancel any refund processing and/or to initiate an investigation of the potential fraud. If not, then the TSP system 110 may resume with its normal tax processing. The TSP system may determine whether there is possible fraud based solely on the notification, based in part on the notification, and/or based on its own independent analysis of the tax payer filing. If the investigation determines that there is no fraud, then the TSP system 110 may resume with its normal tax processing.

2. Tax Alert Processes—Second Example

FIG. 1C-2 illustrates embodiments of a tax alert process. In the illustrated embodiments, starting at (1) the tax payer (whether a user or business representative) or tax preparer files a tax form with a TSP system 110 which may include tax ID (such as, for example, social security number (SSN), individual tax payer identification number (ITIN), US government issued identifier (EIN), or other identifier), name or business name, address, phone number, and so forth. The TSP system 110 may then being processing the tax form. If there is an indication that the TSP system 110 should send a notice or alert about the tax filing to indicate that a tax filing has been submitted, then the TSP system 110 may make a call to the tax fraud alert system 120, such as, for example via an application programming interface (API) or by adding the tax payer's record to a batch file for processing. The communication may be made via a secure communication protocol, such as, for example, hypertext transfer protocol secure (HTTPS), secure file transfer protocol (SFTP), or another secure protocol. The indication may be based on the tax payer requesting a notification and/or the TSP or other system indicating that the tax payer should receive a notification.

The tax fraud alert system 120 may receive the tax filing data via the API or the batch process. If the TSP has requested notification of such errors, the tax fraud alert system 120 may send a notice to the TSP system indicating that there are and/or are not any input errors. This notice may include the information on one or more tax payer files. If there are no errors, the tax fraud alert system 120 may perform a verification process, such as, for example, the identity verification process described in FIG. 2A. The tax fraud alert system 120 may also perform a contact process, such as, for example, the best contact process described in FIG. 2B. If the tax payer is not matched, the tax fraud alert system 120 may determine whether to send a fail request receipt. If the tax payer is matches, then the tax fraud alert system 120 may generate and send a notification or alert to the tax payer using one or more of the contact channels determined by the contact process, for example using the alert notification process described in FIG. 2C. The tax payer may inquire about the notice and/or confirm whether the tax filing was correct or indicate possible fraud. The tax fraud alert system 120 may include a call center system or web portal to handle the tax payer inquiries and/or provide the tax payer access to a remote call center system or web portal which handles such inquiries.

In (2), the TSP system 110 processes the tax form. If there is an indication that the TSP system 110 should send a notice or alert about the tax filing, then the TSP system 110 may make a call to the tax fraud alert system 120, such as, for example via an API or by adding the tax payer's record to a batch file for processing. The communication may be made via a secure communication protocol, such as, for example, HTTPS, SFTP, or another secure protocol. The indication may be based on the tax payer requesting a notification and/or the TSP or other system indicating that the tax payer should receive a notification.

The tax fraud alert system 120 may receive the taxes processed data via the API or the batch process. If the TSP has requested notification of such errors, the tax fraud alert system 120 may send a notice to the TSP system indicating that there are and/or are not any input errors. This notice may include the information on one or more tax payer files. If there are no errors, the tax fraud alert system 120 may generate and send a notification or alert to the tax payer that the taxes have been processed, such as, for example, using one or more of the contact channels determined by the contact process, for example using the alert notification process described in FIG. 2C. The tax payer may inquire about the notice and/or confirm whether the tax filing was correct or indicate possible fraud. The tax fraud alert system 120 may include a call center system or web portal to handle the tax payer inquiries and/or provide the tax payer access to a remote call center system or web portal which handles such inquiries.

If there is a pending refund, then in (3), the TSP processes the refund. If there is an indication that the TSP system 110 should send a notice or alert about the refund, then the TSP system 110 may make a call to the tax fraud alert system 120, such as, for example via an API or by adding the tax payer's record to a batch file for processing. The communication may be made via a secure communication protocol, such as, for example, HTTPS, SFTP, or another secure protocol. The indication may be based on the tax payer requesting a notification and/or the TSP or other system indicating that the tax payer should receive a notification.

The tax fraud alert system 120 may receive the refund data via the API or the batch process. If the TSP has requested notification of such errors, the tax fraud alert system 120 may send a notice to the TSP system indicating that there are and/or are not any input errors. This notice may include the information on one or more tax payer files. If there are no errors, the tax fraud alert system 120 may generate and send a notification or alert to the tax payer that the refund has been sent, such as, for example, using one or more of the contact channels determined by the contact process, for example using the alert notification process described in FIG. 2C. The tax payer may inquire about the notice and/or confirm whether the tax filing was correct or indicate possible fraud. The tax fraud alert system 120 may include a call center system or web portal to handle the tax payer inquiries and/or provide the tax payer access to a remote call center system or web portal which handles such inquiries.

3. Tax Alert Processes—Third Example

Figure 1D:
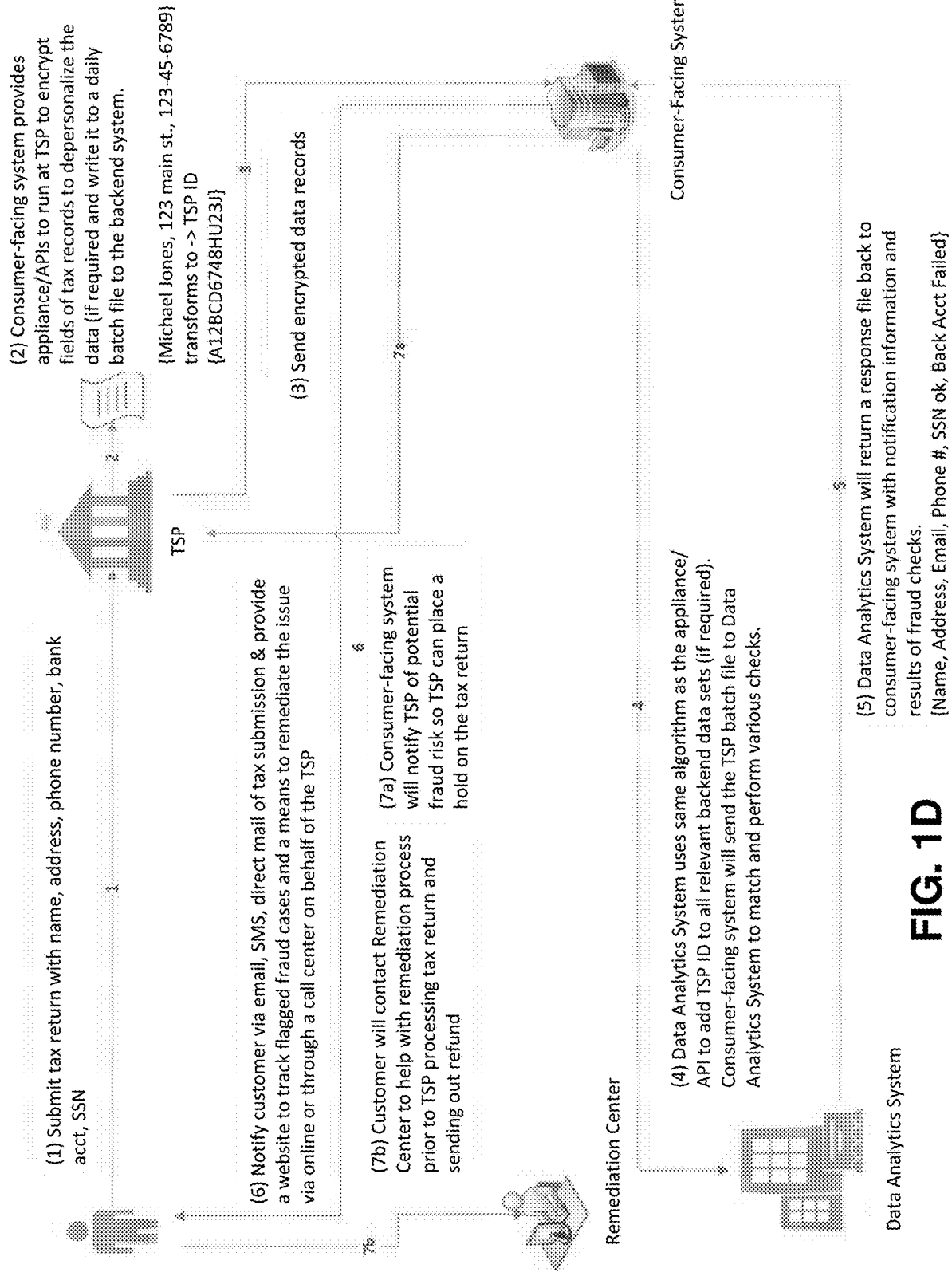

As another example, in FIG. 1D, a user can submit a tax form with PII (for example, name, address, phone number, bank account information, and/or social security number) to one or more TSP systems 110 (Block 1). The TSP system 110 can run a tax fraud alert system 120 appliance/API (provided by the tax fraud alert system 120) to depersonalize the data (Block 2) and then securely send the data to the tax fraud alert system 120 (Block 3), such as, for example, by encrypting fields of tax records to depersonalize the data and then write it to a batch file that is sent to the tax fraud alert system 120 on a periodic basis (for example, real time, hourly, daily, and so forth). As one example, "Michael Jones, 123 main st., 123-45-6789" may transform to TSP ID "A12BCD6748HU23J". The tax fraud alert system 120 may then use the same appliance/API to add the TSP ID to the relevant backend data sets and also send the TSP batch file to the component in the system to perform the various analytics and checks (Block 4) (for example, to the back-end system components, the identity verification engine 122 and best contact engine 124). The system components conduct the analytics and checks and return a response file back to the consumer-facing components of the tax fraud alert system 120 with notification information and the results of the fraud checks such as, for example, whether checks on name, address, email, phone number, SSN, and/or bank account passed or failed (Block 5). The consumer-facing components of the tax fraud alert system 120 then notify the tax payer or customer of the tax submission and provide a portal to track flagged fraud cases and a portal to remediate the issue, such as via an online portal or a call center (Block 6). The user may be notified via one or more channels, such as, for example, email, SMS messaging, and/or direct mail. The consumer-facing components of the tax fraud alert system 120 may also notify the TSP of the potential fraud risk so that the TSP can place a hold on or cancel the tax return and/or refund (Block 7a). The user may contact the remediation center to obtain help with the remediation process prior to TSP processing the tax return and sending out a refund (Block 7b).

4. Tax Alert Processes—Fourth Example

Figure 1E:
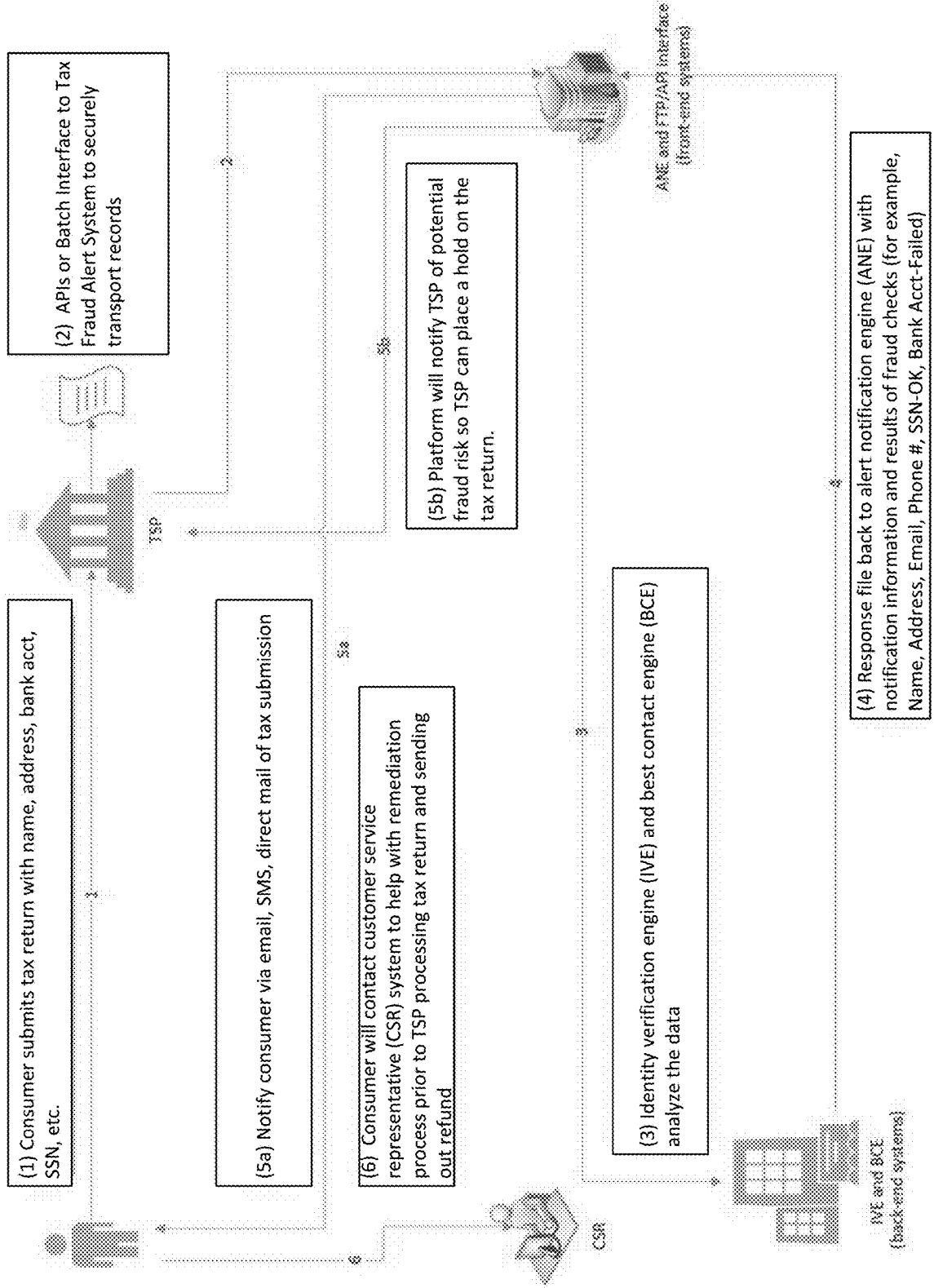

As another example, in FIG. 1E, a tax filer can submit a tax form with PII to one or more TSP systems 110 (Block 1). The TSP system 110 can use an API or batch interface to communicate with a fraud alert system (such as for example, the tax fraud alert system 120 shown in FIG. 1B) to securely transport tax filer's records (Block 2) such as by encrypting the PII and sending the encrypted data to the tax fraud alert system 120 (for example the front-end system accessible via an interface). The tax fraud alert system 120 can then send the data to determine the fraud risk (Block 3), for example, by sending the PII to the back-end system of the identity verification engine 122 and best contact engine 124). An alert may then be provided (Block 4), for example to the alert notification system with notification information and results of the fraud checks, such as, for example, whether checks on name, address, email, phone number, SSN, and/or bank account passed or failed. A person associated with the PII (who may or may not be the same one as the tax filer) may be notified regarding the tax filing such as via email, SMS messaging, and/or direct mail (Block 5a). In addition, the TSP may also be notified of the potential fraud risk so that the TSP can decide whether to place a hold on or cancel the tax return (Block 5b). The tax filer can then contact an entity to assist with the remediation process (Block 6), such as, for example, before the TSP processes the tax return or sends out a tax refund.

The fraud alert system, upon receiving tax filer's records, can analyze the data in the tax filer's records and send results to an alert notification engine. The alert notification engine can notify the tax filer (or another entity if the tax filer is using the other entity's identity) of the tax submission and/or notify the TSP system 110 of the potential fraud risk. The notification to the tax filer can indicate that a tax form has been filed using the entity's tax ID.

It is recognized that FIGS. 1C-1, 1C-2, 1D, and 1E represent embodiments of example systems and processes and that other systems or processes may be used. In some embodiments, the processes are performed by the tax fraud alert system 120 and/or by one of its components, such as a processor or a controls system. However, it is recognized that other components of the tax fraud alert system 120 or other components (not shown) may perform one or more of the processes. For ease of explanation, the following describes the services as performed by the tax fraud alert system 120 or one or more of its components. The example scenarios are intended to illustrate, but not to limit, various aspects of the tax fraud alert system 120. In some embodiments, the processes can vary from the exemplary flowcharts, with some blocks omitted and others added. It is also recognized that one or more blocks in the flowcharts may be optional. The tax fraud alert system 120 may be configured to perform only a subset of the blocks in the flowcharts.

D. Tax Fraud Alert System Components

The illustrated embodiments of FIG. 1B includes a tax fraud alert system 120 which includes an identity verification engine 122, a best contact engine, 124, and an alert notification engine 126. The exemplary tax fraud alert system 120 includes a set of backend servers 128, including an FTP/Batch server 128a configured to process File Transfer Protocol or other batch requests, an API server 128b configured to provide an API portal for other systems to access the tax fraud alert system 120 and/or to make calls to third party APIs, as well as a notification server 128c configured to send and receive electronic notifications.

1. Identity Verification Engine (IVE)

Figure 2A:
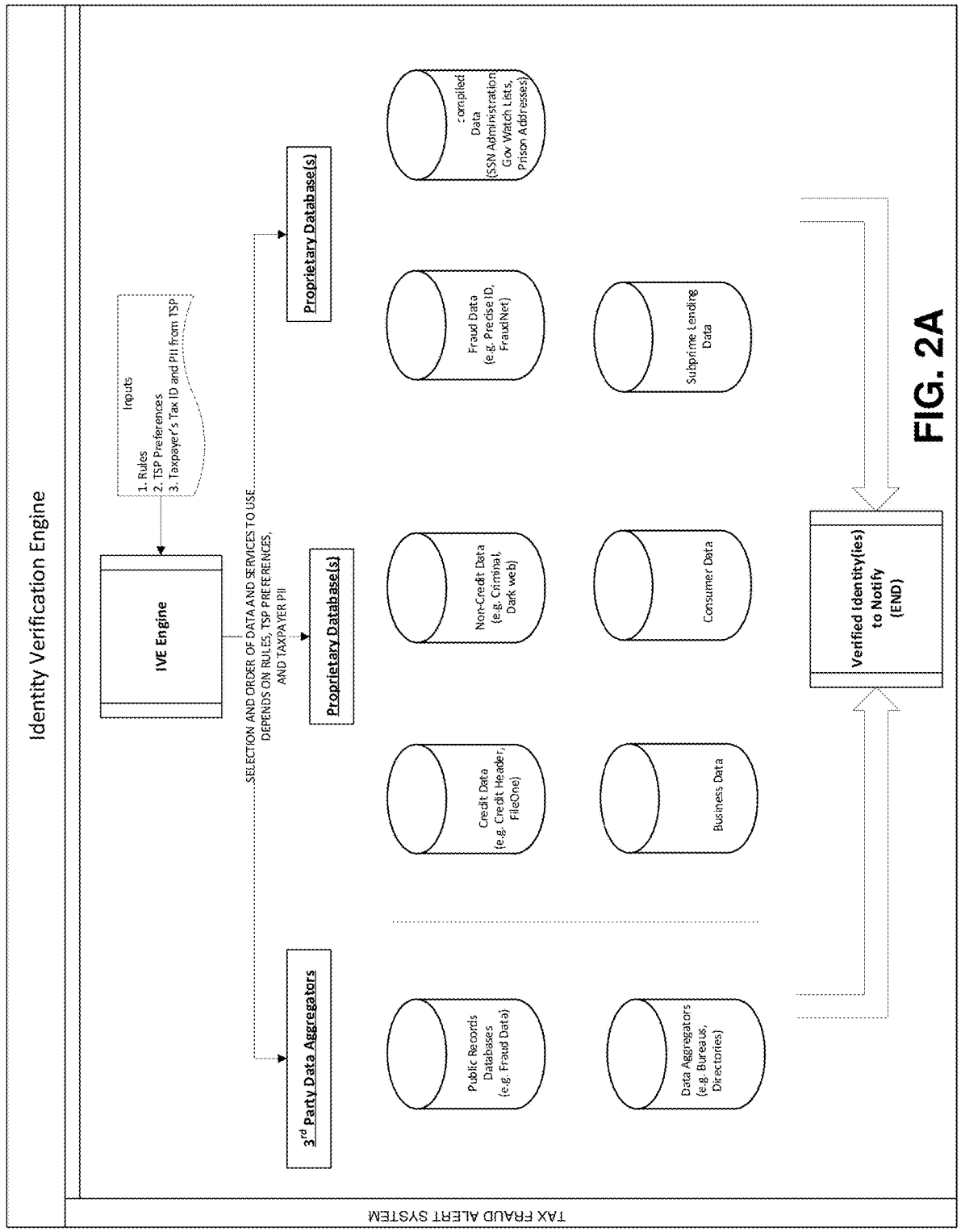
FIG. 2A illustrates example embodiments of an identity verification engine.

FIG. 2A illustrates example embodiments of an identity verification engine (IVE) 122. The IVE or service 122 may use proprietary data from one or more credit bureaus 123 and other relevant data sources to find the best or a close match to the filer identity elements provided in accordance with the preferences agreed to with the TSP. If the tax filing or tax ID is for a business, the IVE rules and supporting data sources may support identifying the business representatives that should be notified of the tax filing.

In the illustrated embodiments of FIG. 2A, the IVE 122 receive inputs including rules, TSP preferences and taxpayer's tax ID and PII from the TSP. The IVE 122 may then access data to select which data to use for the identity verification based on the received inputs. The data may include data from third party data aggregators such as public record databases, fraud data, credit bureaus, and/or directories, data from proprietary databases such as credit data, non-credit data, business data, consumer data, fraud data, subprime lending data, and/or compiled data. The data is then used to verify the identity(ies) and provide notification of whether such identity(ies) were verified.

In some embodiments, some example features of the IVE 122 can include one or more of the following:

The IVE 122 can allow the TSP systems 110 to exchange information with this service via batch files or web service APIs.

The tax filer information can be processed through various software services which include information from credit report tradelines known to one or more credit bureaus as well as data on users that do not have a traditional credit history or an extensive credit history, for example subprime credit data. Some example software services for processing filer information can include a consumer data request fulfillment system (such as for example, the one described on U.S. Pat. No. 9,697,263, the disclosure of which is hereby incorporated by reference herein in its entirety for all purposes) and identity authentication services which can include a risk-based fraud detection and prevention platform which can incorporate analytics, knowledge-based authentication and flexible decision-making strategies for more accurate authentications of identities.

The matching rules in the IVE 122 can be configurable based on the preferences agreed to with the TSP. An example of the configurable matching rules is provided in the section below.

The best identity matches can be selected by the IVE 122 and provided to the Best Contact Engine (BCE) 124.

The BCE 124 verifies or identifies the contact information for the selected one or more identities and passes the one or more identities and aggregated contact information to the Alerts Notification Engine (ANE) 126.

The IVE 122 may also support fraud checks while verify the identity information received from the TSP system. Some example fraud checks can include: SSN check, multiple submissions to the same address (velocity of the same address being used, which may include physical address or IP address), multiple submissions to the same bank account, verify against deceased records, communication checks (email, phone numbers, residential address), or checking NPPI data in the tax filing against the credit bureau data to look for discrepancies and to verify communication channels. Taxpayers that have raised flags for any of the supported fraud checks can be flagged and reported back to the TSP.

Different or additional sources may also be used for this service depending on the inputs provided by the TSP and the TSP preferences for how to handle identify verification.

Special Handling Matching Rules for Identity Verification Engine

In some embodiments, the IVE 122 can include configurable rules. Some example scenarios and configurations are described in the table below.

| Scenario | Description | Options |
| --- | --- | --- |
| No Match (Unverified Input) | No Contact Found with PII given. | Send tax alert notice to input address provided by TSP system, if any<br>Do not send notice<br>If using batch communication with TSP system, add record to failure list<br>If using web service communication with TSP system, return error code for this scenario |

-continued

| Scenario | Description | Options |
|---|---|---|
| Contact Info Mismatch (Partially Unverified Input) | Contact info in filing differs from contact information (such as for example the best contact information) found by service | Send tax alert notice to both the filing contact and the contact found by service<br>Send tax alert notice only to the best contact found by service<br>Do not send notice<br>If using batch communication with TSP system, add record to failure list<br>If using web service communication with TSP system, return error code for this scenario |
| Name Mismatch (Partially Unverified Input) | TSP submitted name on filing and it differs from name this service found for the Tax ID given | Send notice and address the tax alert notice to<br>a. the last name submitted on filing, or<br>b. last name found by the service, or<br>c. both of the above, or<br>d. none of the above<br>Use a generic term such as tax filer<br>Do not send notice<br>If using batch communication with TSP system, add record to failure list<br>If using web service communication with TSP system, return error code for this scenario |
| No Filing Name Given (Partially Unverified Input) | TSP chooses to submit the Tax ID and omit the name | Send notice and<br>a. Address the tax alert to the name found by the service, if any, or<br>b. Do not address the alert to anyone,<br>c. Use a generic term chosen by TSP, such as "tax filer" |
| Multiple Filings | Tax ID has been seen before by the service. Same person may have multiple filings for personal and business(es) | Notice can be sent for a contact (or the best contact) found for the tax ID submitted each time a record of filing is sent by the TSP. |
| Prison contact | A contact or the best contact found is a prison or halfway house | Send alert as with any other address<br>Do not send alert |
| Tax ID flagged as Deceased | The tax ID given is flagged as deceased in the relevant Death Master Files | Send alert anyway following usual rules<br>Do not send notice<br>If using batch communication with TSP system, add record to failure list<br>If using web service communication with TSP system, return error code for this scenario |
| Tax ID flagged as Not Yet Issued | The tax ID is not listed as issued by the appropriate authority | Send alert anyway following usual rules<br>Do not send notice<br>If using batch communication with TSP system, add record to failure list<br>If using web service communication with TSP system, return error code for this scenario |
| Tax ID Issue Date Discrepancy | The tax ID was issued on a date prior to the date of birth of the tax filer, if given or the tax ID was issued too recently. How recent is configured by the TSP. | Send alert anyway following usual rules<br>Do not send notice<br>If using batch communication with TSP system, add record to failure list |

| Scenario | Description | Options |
|---|---|---|
| | | If using web service communication with TSP system, return error code for this scenario |

2. Best Contact Engine (BCE)

Figure 2B:
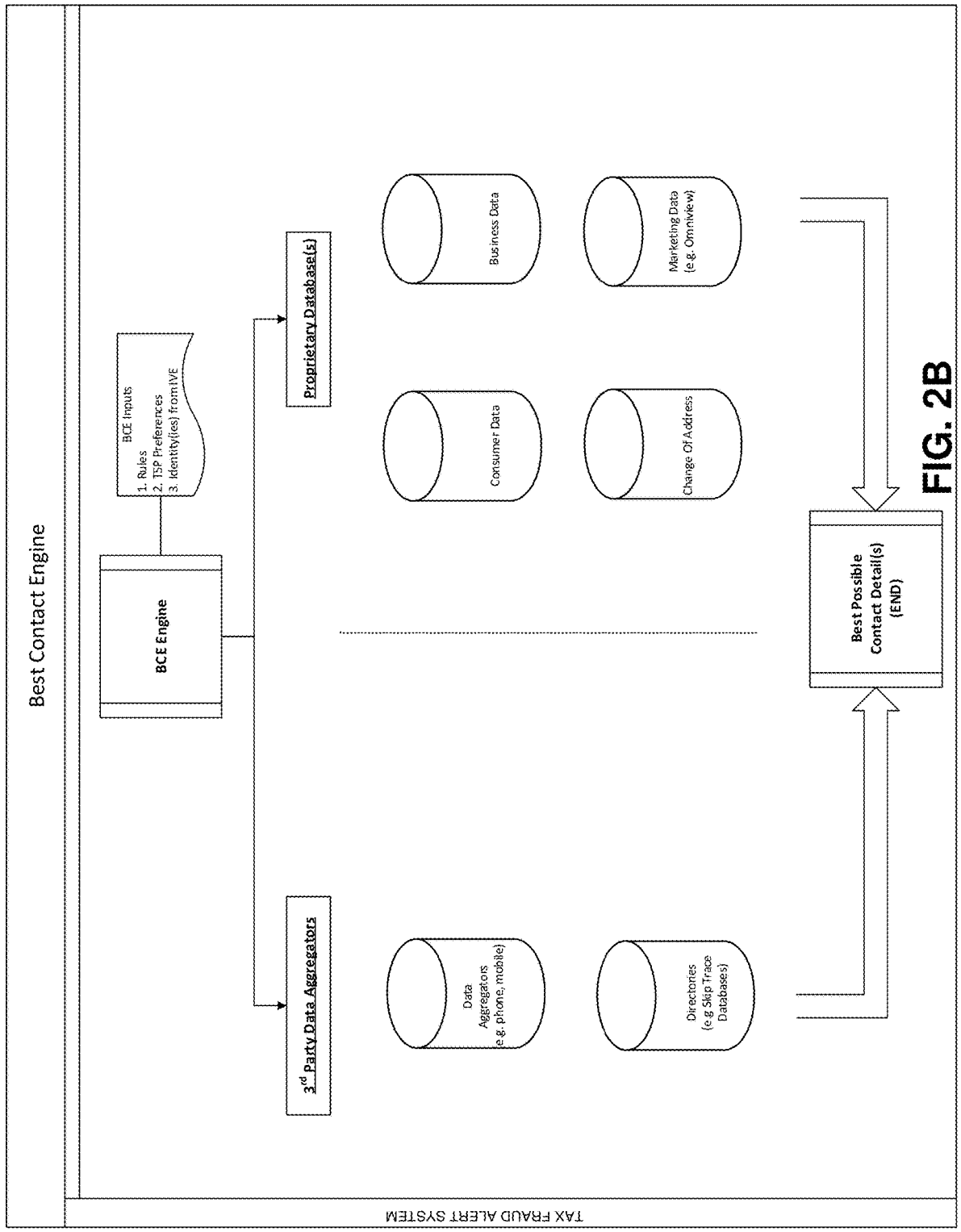
FIG. 2B illustrates example embodiments of a contact engine.

FIG. 2B illustrates example embodiments of a contact engine or best contact engine (BCE) 124. The BCE or service 124 can use proprietary data from one or more credit bureaus and other relevant data sources to find contact information 125 (for example, a matched contact information or the best contact information) for the tax alerts and notify the tax filers in accordance with the preferences agreed to with the TSP.

In the illustrated embodiments of FIG. 2B, the BCE 124 receives input such as rules, TSP preferences, and identity(ies) from the IVE 122. The BCE 124 may then review data to provide contact details. The data may include data from third party data aggregators such as phone or mobile data aggregators, directories, and/or skip trace databases, as well as data from proprietary database such as consumer data, business data, change of address data, and/or marketing data. The BDE 124 then generates an electronic indication of contact details.

The types of information and software services that can be executed together with the BCE 124 for locating the contact information can include one or more of the following:

- Credit tradelines data, such as credit header data or tax filers' contact information.
- Sub-prime loan data which adds coverage for parts of the population that use less traditional lending outlets.
- Marketing tracking data, such as data which link fragmented and incomplete data including email, social and personally identifiable information (PII), across channels and devices. Examples of such marketing tracking data are also described in U.S. Pat. No. 9,767,309, the disclosure of which is hereby incorporated by reference herein in its entirety for all purposes.
- Identity authentication services which can include a risk-based fraud detection and prevention platform which can incorporates analytics, knowledge-based authentication and flexible decision-making strategies for more accurate authentications of identities.
- National change of address services, such as for example monitoring services for change of address.
- Phone directory services including Mobile Network Operators (MNOs).

Different or additional sources may also be used for this service depending on the inputs provided by the TSP and the TSP preferences for how to handle matching ambiguities.

3. Alert Notification Engine (ANE)

Figure 2C:
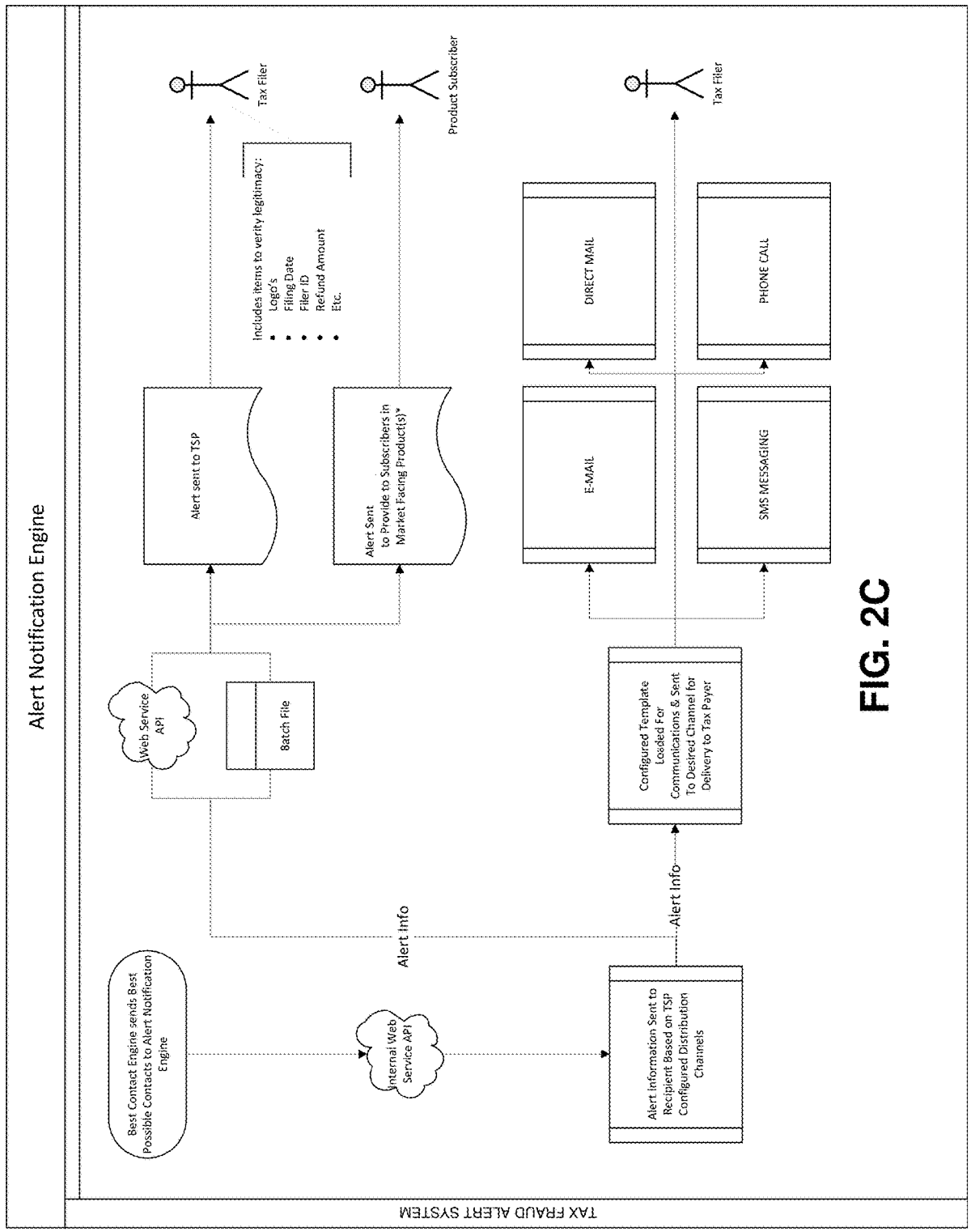
FIG. 2C illustrates example embodiments of an alert notification engine.

FIG. 2C illustrates example embodiments of an alert notification engine (ANE) 126. After locating the contact information for each verified tax filer, in some embodiments, the ANE or service 126 can follow the rules agreed to with the TSP 127 regarding who to contact and how to handle identity matching ambiguities or discrepancies. The notification processes for this service can manage distribution channel and distribution schedule.

In the illustrated embodiments of FIG. 2C, the ANE 126 receives the contact data from the BCE 124 and then generates alert packages to be sent to recipients based on the TSP configured distribution channels. The alert data may be sent to a web service API or to a batch file to allow the tax filer or product/service subscriber to access the alert information. The tax filer may have to provide certain information to access the alert, such as a logon, a filing data, a filer ID, a refund amount, and so forth. The alert data may also, or instead, be provided to a configured template which will be loaded and sent to a desired channel such as email, direct mail, SMS messaging, and/or a phone call.

In some embodiments, distribution channels provide TSP several options for sending the alert to the tax filer. Some example distribution channels include:

- The TSP can choose to use the alert notification engine to deliver the alerts. If this channel is chosen, the TSP can configure the notifications (templates), with the styling and copy they choose. The TSP can also select how the notifications are sent. Notification types include: direct mail, email, SMS text, social media messages, and/or phone voice messages. The TSP may choose one or more of these communication channels or decide to waterfall notifications to these channels: for example, starting with SMS text, and only using email and/or direct mail if the SMS text to the identified phone number fails or a mobile phone is not located for the identity.
- The TSPs can choose to send the alerts from their system. If this channel is chosen, the tax fraud alert system 120 can pass the identity, contacts, and alert information to the TSP via a web service API or a batch file process. The TSP would then be responsible for sending the notice via notification channels (phone, mail, email, and so forth).
- The TSP can also choose to allow the alerts to be sent to subscribers of market facing identity monitoring products. If chosen, the tax fraud alert system 120 can pass the alert information to the a 3rd party entity via web service APIs to provide as a tax filing alert within the subscriber's product.

In some embodiments, distribution schedule may be appropriate to handle large volumes. For example, the alert notification engine can avoid sending a volume of notifications at once that would result in an inquiry volume that could not be supported by the call centers.

In some embodiments, the notification may follow one or more templates which may be approved by TSPs. Selection of appropriate templates depending on TSP preferences, notification channel (for example, the template for text messages would be different than the template for emails), and PII available for a tax filer. Parameter substitution for notification templates including ways for tax payers or tax filers to authenticate that the tax alert notice is legitimate. Some examples of how to show legitimacy of the alert include one or more of:

- Official Tax Service Provider letterhead for direct mail.
- Official TSP logos in email.
- Official TSP phone greetings or voice talent.

Partial Tax ID, if approved by TSP. This could be made available only by call center agents or web service portal if TSP deems too sensitive to send in tax alert.

Tax Filing Date.

Name on filing if it matches name service found. Including name on filing is problematic if there is a conflict between filing and what service found.

Partial email address given at time of filing. This might be problematic in cases of fraud.

Tax filing details such as dollar amounts if Tax Service Provider is willing to submit those with each record.

Notices can include safeguards to make it difficult for fraudsters to replicate the alerts to launch phishing attacks. For example, if the TSP chooses, any emails sent could exclude direct links.

Marketing campaigns can educate the tax payers or tax filers on ways to confirm the tax alert is legitimate, for example promoting that official emails from the TSP may not include direct links.

In some embodiments, each tax alert sent can include a unique identifier that can be used by the user when contacting the branded call center, reaching the branded web portal to handle tax alert inquiries, and/or when calling the TSP directly to inquire about the alert or to dispute the tax filing.

4. Alert Notification Support and Remediation via Portal and Call Center

As part of this solution, in some embodiments, the tax fraud alert system 120 can offer TSPs multiple options to support the tax filers that receive the tax alert notification. The alert itself can include the appropriate calls to action for the filer in accordance with the option(s) the TSP selected for offering alert notification support. Some examples of alert notification support can include one or more of:

Refer filers to a call center hosted by the TSP. This option is supported by providing the TSP with information about the tax alert notifications sent including the ways the filer was contacted, when, and, if necessary, the actual contact details used for the notification(s).

Refer filers to a web portal hosted by the TSP. This option is supported by providing the TSP information about the tax alert notifications sent including the ways the filer was contacted, when, and, if necessary, the actual contact details used for the notification(s).

A hosted call center. The call center can be hosted by an entity running the tax fraud alert system 120. The call center can include training to assist filers that receive a tax alert notification or have general questions about it. The scope of what call center staff can handle or escalate to the TSP depends on TSP configuration options.

A hosted web portal. The web portal can be hosted by an entity running the tax fraud alert system 120 and be tailored to assist filers that receive a tax alert notification or have general questions about it. The functionality available in the portal depends on TSP configuration options.

In certain embodiments, the TSP may choose to host the web portal or the call center, alone or in combination.

In some embodiments, the TSP can also choose which functions may be offered by the call center or the web portal as applicable if TSP chooses to have another entity to host the call center or the web portal. Some example functions can include one or more of:

General information and questions and answers about the tax fraud alert system 120. Content and any call center scripts can be configurable and approved by the TSP.

Authentication of tax filer. TSP can be given options for authenticating the caller including 2 factor authentication, knowledge based authentication, or other proprietary authentication options.

Reviewing previously sent tax alerts.

Initiating a dispute of a tax filing.

Stop payment of a refund

For some options, such as, for example, the last two options (initiating a dispute of a tax filing and stopping payment of a refund), TSP may choose to have the host (of the call center and/or web portal) to either escalate handling of disputes and/or stop payments on refunds, or the TSP may offer a web service that allows the host to initiate a dispute programmatically via either the web portal and/or an administrative tool available to the call center staff.

5. Call Center Support

Figures 1, 2D:
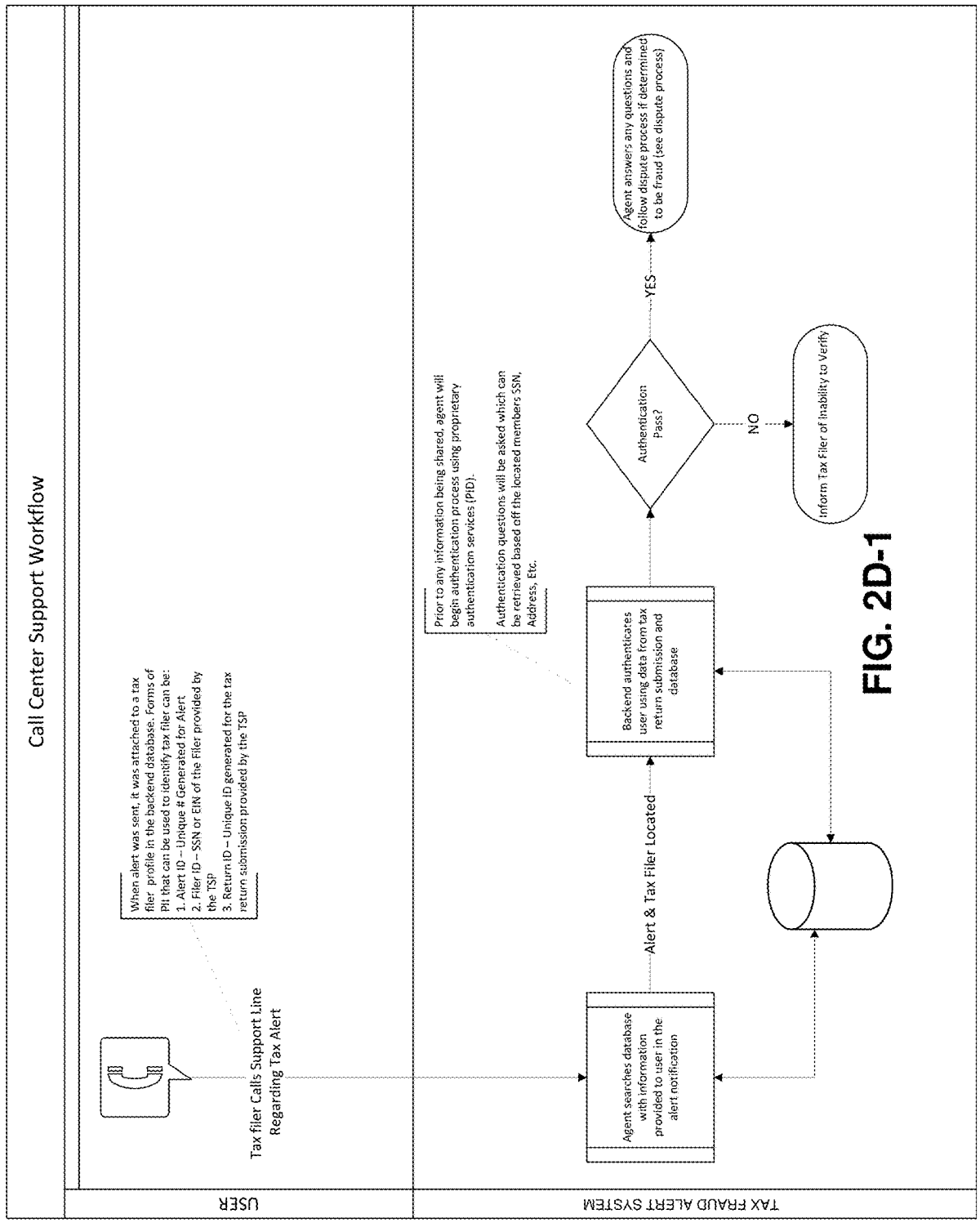
Figures 2, 2D:
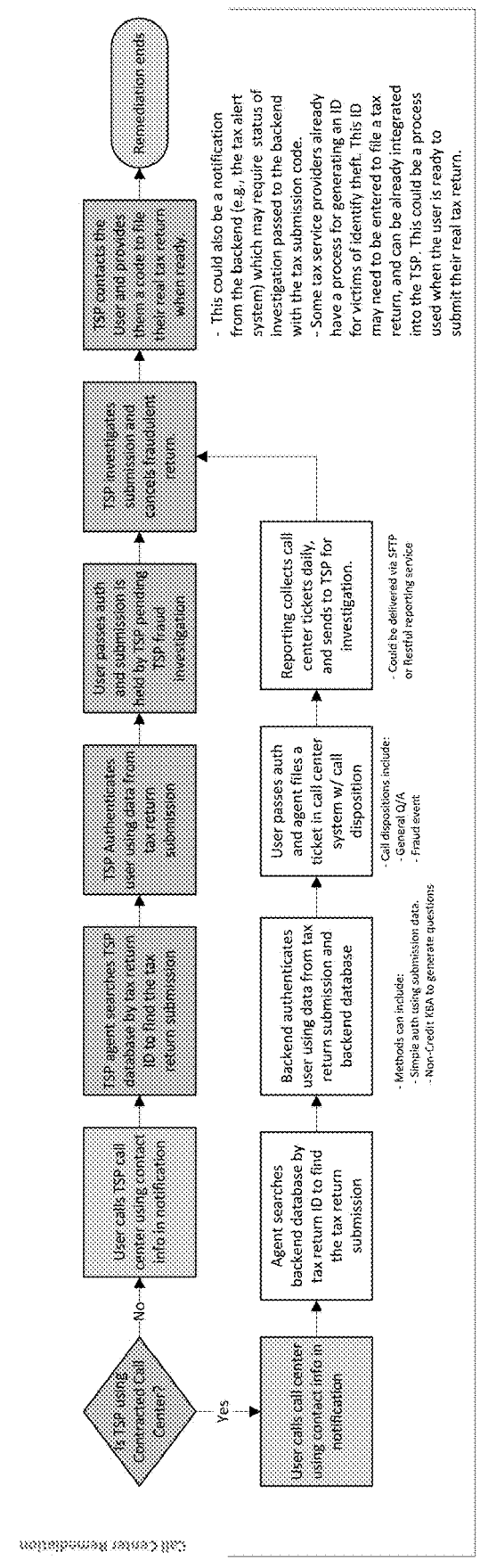

FIGS. 2D-1 and 2D2 illustrate flow diagrams for embodiments of call center support processes. If the TSP chooses the call center support option, the host of the call center support service can provide call center agents trained to handle inquiries from users that received a tax alert. The agents can be given training and scripts approved by the TSP with detailed instructions on how to address all possible inquiries from the end user and how to escalate issues. The scope of what the call center can handle may depend on the configurable options chosen by the TSP.

In the illustrated embodiments of FIG. 2D-1, a tax filer calls a support line and an agent searches a database with information provided to the tax filer in the alert notification to locate the tax filer. When the alert was sent, the alert may have been electronically attached to the tax filer's profile in a backend database. It is recognized that a variety of PII may be used to identify a tax filer, including, for example, alert ID (for example, a unique identifier generated for an alert), a filer ID (for example, the social security number of entity number of the filer provided by the TSP), and/or a return ID (for example, a unique identifier generated for the tax return submission provided by the TSP). The tax filer may be authenticated, for example, using data from the tax filer's tax return submission. The agent may initiate authentication by accessing an authentication process of a proprietary authentication service. For example, authentication questions may be asked which can be retrieved based on the located user's social security number, address, and so forth. If the tax filer passes the authentication, the agent may be directed by the system to answer the tax filer's questions and/or initiate a dispute process. If the tax filer does not pass the authentication, the agent may be presented with instructions to inform the tax payer or customer of the inability to verify the tax filer's information.

In the illustrated embodiments of FIG. 2D-2, the system determines whether the TSP is using a contracted call center or the TSP's call center. If a contracted call center, then a call is received by the contracted call center, the agent searches a backend database by tax return ID to find the tax return submission, the backend authenticates the user using data from the tax return submission and backend database (for example, simple authentication using submission data, or non-credit knowledge based authentication), if the user passes the authentication the agent files a ticket in the call center system and includes call disposition data (for example general questions and answer, fraud event information), the reporting collects the call center tickets on a regular basis (for example, in real time, hourly, daily, and so forth) and send them to the TSP for investigation (for example, via FTP, SFPT, restful reporting service, and so forth). If a TSP call center, the TSP receives the call. The TSP agent searches the TSP database by tax return ID to find the tax return submission, the TSP authenticates the user using data from the tax return submission, if the user passes the authentication, the submission is held by TSP pending TSP's fraud investigation.

In both scenarios, next the TSP may investigate the submission and cancel the fraudulent return or puts the return on hold. The TSP contacts the user and provides them a code to file their real tax return when ready. In some embodiments, this could be a notification from the backend (for example, the tax fraud alert system 120) which may pass the status of the investigation to the backend with a tax submission code. It is recognized that some TSPs may have a process for generating unique IDs for victims of identity theft. This ID may be entered to file a tax return and may be already integrated into the TSP. This could be used when the user is ready to submit their real return.

It is recognized that one or more of the TSPs may use a different process and so the embodiments of FIG. 2D-2 are meant to illustrate example embodiments and not limit the disclosure.

In some embodiments, the host's databases (or other databases) may be used to implement one or more of the following functions related to call center support:
- When alert is sent, it can be attached to a tax payer or customer profile in the host database. Forms of PII that can be used to identify the tax payer or customer can be:
  - Alert ID: Unique #Generated for the alert;
  - Filer ID: SSN or EIN of the filer provided by the TSP; and/or
  - Tax Form ID: Unique ID generated for the tax form submission provided by the TSP.
- Authenticate the identity of the user using the PII and any tax filing details provided by the TSP system, plus proprietary methods of authentication.
- Review the tax alerts sent.
- Clearly guide the user through next steps if the tax filing is not recognized by the user
- Ability to view and relay status of previous inquiries started by the end user. This may require that the TSP system 110 provide a way to look up status or a way for the TSP system 110 to push inquiry or dispute status to the service.

6. Web Portal Support

Figure 2E:
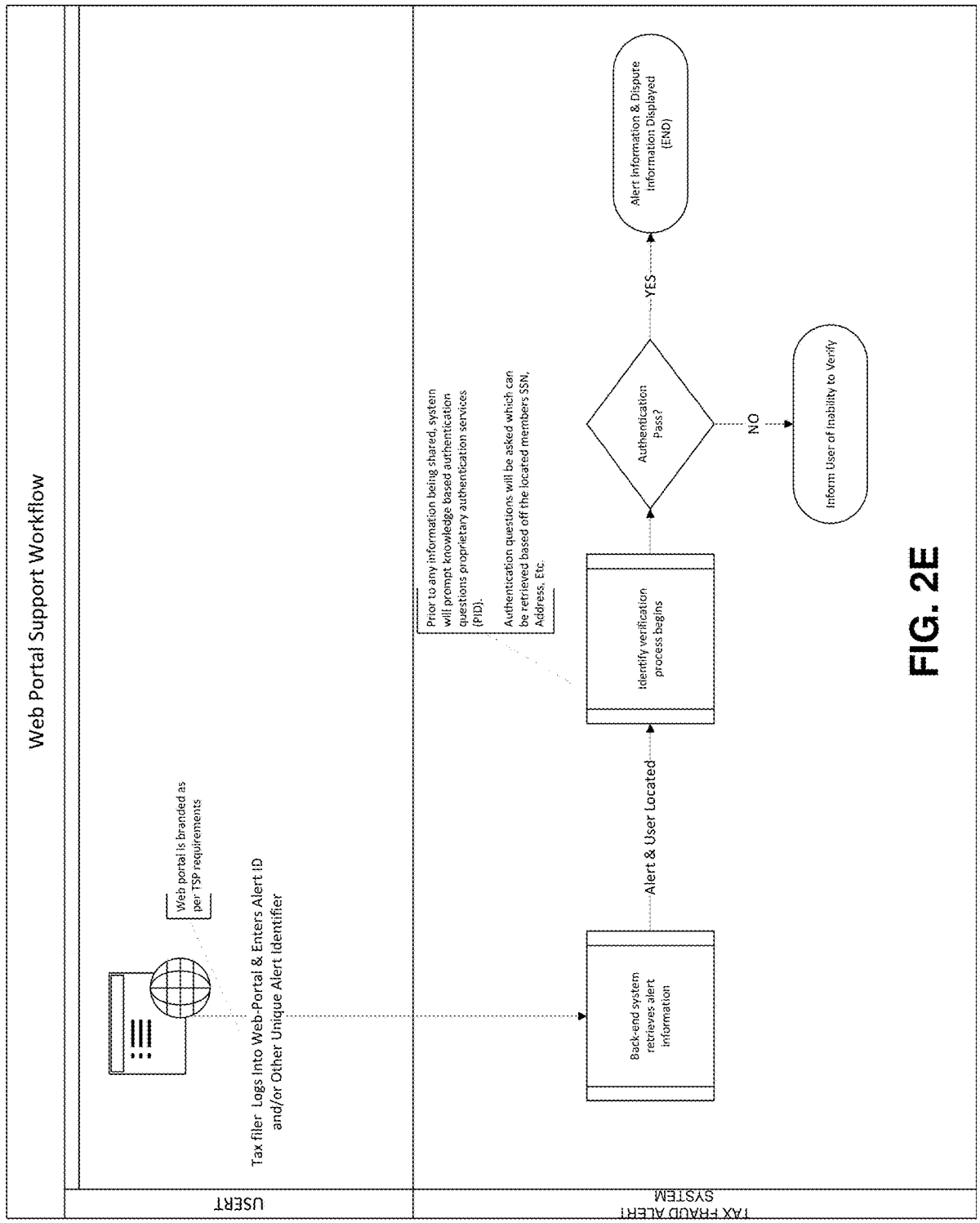
FIG. 2E illustrates a flow diagram for embodiments of a web portal support process.

FIG. 2E illustrates a flow diagram for embodiments of a web portal support process. If the TSP chooses the web portal support option, a host of the web portal can provide a web service portal to service users with the look, feel, and content approved by the TSP. The portal can be designed to handle inquiries from users that received a tax alert.

In the illustrated embodiments of FIG. 2E, the backend system receives an indication that a tax filer has logged onto the web portal and retrieves alert information associated with the user. The identity verification process is initiated. For example, in some embodiments, prior to any information being shared, the system may prompt knowledge based authentication questions and/or use proprietary authentication services. The knowledge based authentication questions may be based off of the located user's social security number, entity number, address and so forth. If the user's passes authentication, the alert information and dispute information may be display on a user interface. If the user does not pass authentication, the portal may inform the user of its inability to verify the user.

The portal can have automated ways or static content that address one or more of the following functions:
- Authenticate the identity of the user using the PII and any tax filing details provided by the TSP, plus proprietary methods of authentication.
- Present the tax alert(s) details.
- Clearly guide the user through next steps if the tax filing is not recognized by the user
- Inform the TSP via an automated or offline process that the user disputes having filed taxes. This process could either suspend delivery of the refund or initiate additional investigation by the TSP.
- Ability to display status of previous inquiries started by the end user. This requires that the TSP provide a way to look up status or a way for the TSP to push inquiry or dispute status to the service.

It is recognized that white labeling services may be provided allowing one or more tax filer facing systems to be branded with one entity and one or more backend processes or services to be run by an entity other than the entity associated with the branding. In such case, the white labeling services may be hosted by the backend processes and/or a system of the entity associated with the branding.

7. Dispute Process

FIG. 2F illustrates a flow diagram for embodiments of a dispute process. In the illustrated embodiments of FIG. 2F, a tax filer calls or logs onto a portal and is provided alert details. An agent may initiate a dispute and may then transfer the call to the appropriate TSP, submit the dispute via a web service tool which may be integrated with the appropriate TSP, and/or submit the dispute via a batch service tool which may be integrated with the appropriate TSP. The TSP then receives the dispute and may suspend the refund and initiate an investigation. The web service tool and/or batch service tool may be provided by a customer service representative (CSR) system.

The TSP can establish manual or automated processes that allow the tax fraud alert system 120 to perform one or more of the following:
- Notify the TSP that a user disputes a tax filing and either suspend a refund or initiate additional investigation of the tax filing,
  - For example, this can be achieved by:
    - Warm call transfer to the TSP, or
    - Automated process via web services or batch file.
- Provide status of an inquiry or dispute previously submitted, including resolution.
  - For example, this can be achieved by:
    - Batch file, or
    - Web services.

E. Pre-Launch Service Configuration

In some embodiments, the tax fraud alert system 120 also includes one or more components and processes to provide automated configuration services for the other systems, such as the TSP systems, third party vendors, or third party data suppliers. The configuration may be provided via a remotely accessible portal that allows a user of a third party system to access the portal, review the options for configuration, provide electronic indications of the selected options, and instruct the portal to store the options. Prior to launching the tax fraud alert system 120, the TSP can configure one or more of the following options:
- PII to use: What minimum and optional PII to submit to the service.
- Handling matching scenarios
  - How to handle ambiguities or discrepancies of identity based on the PII provided. The TSP can have the service configured to only send notices to tax filers that have been verified, for example, the contact information found by the service matches the contact information in the tax filing; and/or to also send tax alerts to the contact information in the tax filing, even if that information is unverified by the service. For example, if TSP only provides a tax ID and the service locates several names tied to that tax ID, the service can be configured to perform one or more of the following actions:
  Notify one or more or all of the names found or to not send notices; and/or
  Callback (automatically in batch, web service, or via a call center) to the TSP system 110 to suspend delivery of a refund or initiate further investigation before sending the refund.
Or for example, if a TSP system 110 provides the tax ID, name, and address used in the tax form filed and the tax fraud alert system 120 finds a different name and/or address tied to the tax ID, the service can be configured to perform one or more of the following actions:
  Send notices using the PII used in the tax filing and/or to the PII found by the service; and/or
  Callback to the TSP system 110 to suspend delivery of a refund or initiate further investigation before sending the refund.
Whether to flag cases of tax ID typos—whether to have the service indicate when a tax ID does not match the PII provided, but a transposed digit in the tax ID would resolve the discrepancy. This may be difficult to automate but it is possible to do using credit bureau data or other third party data.
Whether to receive error responses for inputs submitted, including bad input data, ambiguous or contradictory results, no matching results.
A table enumerating known conditions and options for how to handle each can be presented to the TSP system.
Media used for notices: Whether to notify tax filers via direct mail, and/or email, phone, or text message.
Who to notify
  Whether to notify both parties in a joint filing.
  Whether to make exceptions on whom to send notices to, for instance, do not send notices to prisons or those where the tax ID is listed as deceased or unverified tax filers.
When to notify: Whether to notify for one or more of the following events:
  Main tax form is filed (for example, 1040 or 1040-EZ) or other selected forms.
  Tax form filed has completed processing or requires more details.
  Suspended refund or suspended processing (for example, due to suspected fraud).
  Resolution of a suspended refund or suspended processing.
Who to address notices to: Whether to address notices to the name used in the tax filing and/or to the name(s) found by the service.
Handling user inquiries
  Whether to have this solution host a call center and/or a web portal to answer inquiries from users that receive a tax alert.
  If this service is to host a web portal on behalf of the TSP, whether that portal can offer identity theft services to the user.
  Whether to receive real-time callbacks when users respond to the call center and/or the web portal provided by the service.
  Whether to provide an automated web service callback mechanism or other scalable process to suspend delivery of a tax refund or initiate further investigation.
Method of data transfer: Whether to exchange information with this service via batch files, web service calls, call centers, and/or offline.

F. Inputs supported by the Tax Alerts Service

In some embodiments, the TSP may be offered configurable options for what information to share and how to share it. Some features in this solution can only be available if certain optional inputs are provided. For example, the ability to present to the end user dollar amounts specific to their tax filing as a way for the user to gain confidence that the notification is legitimate would only be possible if the TSP is willing to provide such dollar amounts for use in this solution. Omission of optional PII might reduce the efficacy of the service or render some features unavailable.

In some embodiments, the PII submitted can be expected to be what the tax filer provided in the tax form filing and does not necessarily have to be verified by the TSP before submitting the PII to the service. Examples of submitted PII may include one or more of the following:
  Tax ID*: Tax ID, ITIN, EIN or any tax identifier supported by the local, state, or federal government agency collecting the taxes. It can be used to confirm a match and find the contact information for sending notices. The tax ID may be for an individual or a business entity.
  Full Name*: First Name, Middle Name, Last Name, Suffix. If given, it can be used to help confirm a match and potentially to address the notices sent depending on TSP preferences.
  Address*: street1, street2, city, state, postal code or other applicable fields if the address is outside the USA.
  Date of Birth: If given, it can be used to help confirm a match.
  Phone: If given, it can be used to help confirm a match and possibly for notification.
  Email: If given, it can be used to help confirm a match and possibly for notification.
  Filing status: Any status supported by the local, state, or federal government agency collecting the taxes. For example, married filing jointly. If given, it can be used in the tax alert to give the user more confidence that the notice is legitimate.
  Joint Filer Tax ID: Tax ID, ITIN, EIN or any tax identifier supported by the local, state, or federal government agency collecting the taxes. It can be used to confirm a match and find the contact information (such as for example, the best contact information) for sending notices. Joint filer information should only be provided if the TSP wants to notify both parties in a joint filing.
  Joint Filer Full Name: First Name, Middle Name, Last Name, Suffix. If given, it can be used to help confirm a match and potentially to address the notices sent depending on TSP preferences. Joint filer information should only be provided if the TSP wants to notify both parties in a joint filing.
  Joint Filer Date of Birth: If given, it can be used to help confirm a match. Joint filer information should only be provided if the TSP wants to notify both parties in a joint filing.
  Joint Filer Phone: If given, it can be used to help confirm a match and possibly for notification
  Joint Filer Email: If given, it can be used to help confirm a match and possibly for notification. Joint filer information may only be provided if the TSP wants to notify both parties in a joint filing.

Tax Filing Date: If given, it can be used in the tax alert to give the user more confidence that the notice is legitimate.

Tax Preparer: Name of tax preparer software, company, or person. If given, it can be used in the tax alert to give the user more confidence that the notice is legitimate.

Tax Filing Detail1 Label: If given, it can be used in the tax alert to give the user more confidence that the notice is legitimate. For example, "Adjusted Gross Income" submitted in tax filing. It could also be used to authenticate the user if s/he calls or visits the web portal to inquire about the notice.

Tax Filing Detail1: If given, it can be used in the tax alert to give the user more confidence that the notice is legitimate. For example, Adjusted Gross Income amount submitted in tax filing. It could also be used to authenticate the user if s/he calls or visits the web portal to inquire about the notice.

Tax Filing Detail2 Label: If given, it can be used in the tax alert to give the user more confidence that the notice is legitimate. For example, "Previous Year Refund or Payment". It could also be used to authenticate the user if the user calls or visits the web portal to inquire about the notice.

Tax Filing Detail2: I given, it can be used in the tax alert to give the user more confidence that the notice is legitimate. For example, Previous Year Refund or Payment amount. It could also be used to authenticate the user if he or she calls or visits the web portal to inquire about the notice.

Where "*" represents either tax ID or Full Name and Address may be required for this service in some embodiments. In some embodiments, there is no requirement for TSP to perform input validation such as ensuring Tax ID is not in death master file or has been issued long enough ago to justify a tax filing.

G. Example Computing System Implementation and Architecture

Figure 3:
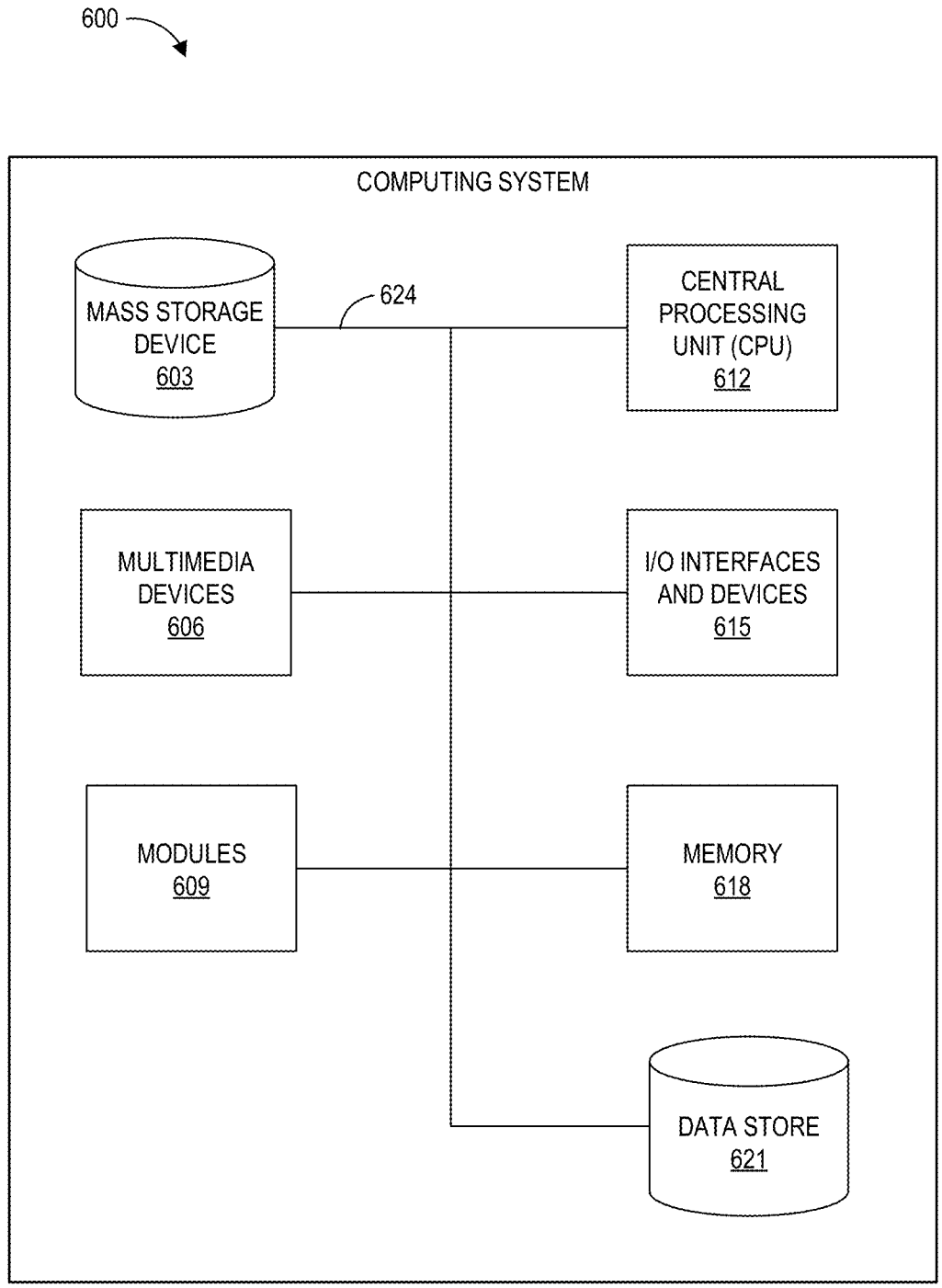
FIG. 3 illustrates an embodiment of a computing system which may implement example embodiments of one or more components of the tax fraud alert system.

FIG. 3 illustrates a general architecture of a computing system for processing implementing various aspects of the present disclosure. Many or all of the components of the computing system shown in FIG. 3 may be included in the various computing devices and systems discussed herein, including the TSP systems, the tax fraud alert system 120, the tax filer system 130, the third party vendor systems, the third party data systems, and so forth. The computing system may include, for example, a personal computer (such as, for example, IBM, Macintosh, Microsoft Windows compatible, OS X compatible, Linux/Unix compatible, or other types of computing systems, alone or in combination), a server, a workstation, a laptop computer, a smart phone, a smart watch, a personal digital assistant, a kiosk, a car console, a tablet, or a media player. In one embodiment, the computing system's processing system 600 includes one or more central processing units (CPU) 612, which may each include a conventional or proprietary microprocessor specially configured to perform, in whole or in part, one or more of the features described above. The processing system 600 further includes one or more memory 618, such as random access memory (RAM) for temporary storage of information, one or more read only memory (ROM) for permanent storage of information, and one or more mass storage device 603, such as a hard drive, diskette, solid state drive, or optical media storage device. A data store 621 may also be included. In some implementations, the data store 621 may be designed to handle large quantities of data and provide fast retrieval of the records. To facilitate efficient storage and retrieval, the data store 621 may be indexed using one or more of compressed data, identifiers, or other data, such as that described above.

Typically, the components of the processing system 600 are connected using a standards-based bus system 624. In different embodiments, the standards-based bus system 624 could be implemented in Peripheral Component Interconnect (PCI), Microchannel, Small Computer System Interface (SCSI), Industrial Standard Architecture (ISA) and Extended ISA (EISA) architectures, for example. In addition, the functionality provided for in the components and modules of processing system 600 may be combined into fewer components and modules or further separated into additional components and modules.

The processing system 600 is generally controlled and coordinated by operating system software, such as Windows XP, Windows Vista, Windows 7, Windows 8, Windows 10, Windows Server, Unix, Linux, SunOS, Solaris, iOS, MAC OS X, Blackberry OS, Android, or other operating systems. In other embodiments, the processing system 600 may be controlled by a proprietary operating system. The operating system is configured to control and schedule computer processes for execution, perform memory management, provide file system, networking, I/O services, and provide a user interface, such as a graphical user interface (GUI), among other things. The GUI may include an application interface and/or a web-based interface including data fields for receiving input signals or providing electronic information and/or for providing information to the user in response to any received input signals. A GUI may be implemented in whole or in part using technologies such as HTML, Flash, Java, .net, web services, and RSS. In some implementations, a GUI may be included in a stand-alone client (for example, thick client, fat client) configured to communicate (for example, send or receive data) in accordance with one or more of the aspects described.

The processing system 600 may include one or more commonly available input/output (I/O) devices and interfaces 615, such as a keyboard, stylus, touch screen, mouse, touchpad, and printer. In one embodiment, the I/O devices and interfaces 615 include one or more display devices, such as a monitor, that allows the visual presentation of data to a user. More particularly, a display device provides for the presentation of GUIs, application software data, and multimedia presentations, for example. The processing system 600 may also include one or more multimedia devices 606, such as speakers, video cards, graphics accelerators, and microphones, for example.

In the embodiment of FIG. 3, the I/O devices and interfaces 615 provide a communication interface to various external devices. The processing system 600 may be electronically coupled to one or more networks, which comprise one or more of a LAN, WAN, cellular network, satellite network, and/or the Internet, for example, via a wired, wireless, or combination of wired and wireless communication link. The networks communicate with various computing devices and/or other electronic devices via wired or wireless communication links. The communication can occur using various protocols such as, for example, the File Transfer Protocol (FTP), Secure File Transfer Protocol (SFTP), Hypertext Transfer Protocol (HTTP), Transmission Control Protocol/Internet Protocol (TCP/IP), and so on.

In some embodiments, information may be provided to the processing system 600 over a network from one or more data sources. The data sources may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, a non-relational database, an entity-relationship database, and object-oriented database, and/or a record-based database.

In general, the word "module," as used herein, refers to logic embodied in hardware or firmware, or to a collection of software instructions, possibly having entry and exit points, written in a programming language, such as, for example, Java, Lua, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the processing system 600, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules. They may be represented in hardware or firmware. Generally, the modules described herein refer to logical modules that may be combined with other modules or divided into sub-modules despite their physical organization or storage.

In the example of FIG. 3, the modules 609 may be configured for execution by the CPU 612 to perform, in whole or in part, any or all of the process discussed above. The processes may also be performed by one or more virtual machines. For example, the processes may be hosted by a cloud computing system. In some embodiments, one or more components of the processing system 600 may be part of the cloud computing system. Additionally or alternatively, the virtualization may be achieved at the operating system level. For example, the one or more processes described herein may be executed using application containerization. The one or more processes may also be implemented on a Lambda architecture designed to handle mass quantities of data by taking advantage of the batch processing and the stream processing.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. In some embodiments, at least some of the processes may be implemented using virtualization techniques such as, for example, cloud computing, application containerization, or Lambda architecture, so on, alone or in combination. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a virtual machine, a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A fraud detection and alert system comprising:
   one or more data stores configured to store:
      computer-executable instructions,
      user data associated with a plurality of users that is received from a tax authority, wherein the user data includes first user data associated with a first user, and
      verification data associated with one or more of the plurality of users based at least in part on proprietary and public datasets, wherein at least a portion of the verification data is different from the user data received from the tax authority, and wherein the verification data includes first verification data associated with the first user;
   a network interface configured to communicate with a plurality of network service devices; and
   one or more physical computer processors in communication with the one or more data stores, wherein the computer-executable instructions, when executed, configure the one or more processors to:
      receive and store, from a tax authority via the network interface, an electronic batch file that includes a plurality of electronic requests, wherein each electronic request of the plurality of electronic requests is for a filing of an application, wherein a first electronic request of the plurality of electronic requests is associated with a first user, a first application, and includes the first user data, wherein the first user data includes an alphanumeric identifier that is generated based at least in part on encrypted personally identifying information (PII) associated with the first user;
      based at least in part on the first electronic request and a configurable rules engine, determine a matching user to the identity of the first user by comparing at least a portion of the first user data to the first verification data;
      based at least in part on the determination of the matching user, transmit, to a user device via the network interface, a notification associated with the matching user regarding the first application;
      receive, from the user device via the network interface, a potential fraud indication indicating that the first application or the first electronic request is possibly fraudulent;
      determine, based at least in part on the potential fraud indication, that the first application or the first electronic request is fraudulent; and
      generate and transmit, to the tax authority via the network interface, electronic instructions to stop processing the first application as requested by the first electronic request.

2. The fraud detection and alert system of claim 1, wherein the first user data further includes personally identifying information (PII) associated with the first user.

3. The fraud detection and alert system of claim 1, wherein the notification to the user device regarding a successful application filing of the first application is transmitted to a type of contact included in the verification data.

4. The fraud detection and alert system of claim 1, wherein the one or more physical processors are further configured by machine readable instructions to:
   transmit, to an external third party entity via the network interface, the electronic instructions to stop the processing of the first application.

5. A computerized method for detecting fraudulent tax filings, the computerized method comprising:
   receiving and storing, from a tax authority via the network interface, an electronic batch file that includes a plurality of electronic requests, wherein each electronic request of the plurality of electronic requests is for a filing of an application, wherein a first electronic request of the plurality of electronic requests is associated with a first user, a first application, and includes first user data associated with the first user, wherein the first user data includes an alphanumeric identifier that is generated based at least in part on encrypted personally identifying information (PII) associated with the first user;
   based at least in part on the first electronic request and a configurable rules engine and using one or more computer processors, determine a matching user to the identity of the first user by comparing at least a portion of the first user data to first verification data associated with the first user and based at least in part on proprietary and public datasets, wherein at least a portion of the first verification data is different from the first user data received from the tax authority;
   based at least in part on the determination of a matching user, transmitting, to a user device via the network interface and one or more computer processors, a notification associated with the matching user regarding the first application;
   receiving, from the user device via a network interface, a potential fraud indication indicating that the first application or the first electronic request is possibly fraudulent;
   determining, via one or more computer processors, based at least in part on the potential fraud indication, that the first application or the first electronic request is fraudulent; and generating and transmitting, to the tax authority via the network interface and the one or more computer processors, electronic instructions to stop processing the first application as requested by the first electronic request.

6. The computerized method of claim 5, wherein the first user data further includes personally identifying information (PII) associated with the first user.

7. The computerized method of claim 5, wherein the notification to the user device regarding a successful application filing of the first application is transmitted to a type of contact included in the verification data.

8. The computerized method of claim 5, further comprising:
transmitting, to an external third party entity, the electronic instructions to stop the processing of the first application.

9. A non-transitory storage medium for storing instructions adapted to be executed by a processor to perform a method for automatically detecting fraudulent tax filings, the instructions comprising:
receiving and storing, from a tax authority, an electronic batch file that includes a plurality of electronic requests, wherein each electronic request of the plurality of electronic requests is for a filing of an application, and wherein a first electronic request of the plurality of electronic requests is associated with a first user, a first application, and includes the first user data associated with the first user, wherein the first user data includes an alphanumeric identifier that is generated based at least in part on encrypted personally identifying information (PII) associated with the first user;
based at least in part on the first electronic request and a configurable rules engine, determine a matching user to the identity of the first user by comparing at least a portion of the first user data to the first verification data associated with the first user and based at least in part on proprietary and public datasets, wherein at least a portion of the first verification data is different from the first user data received from the tax authority;
based at least in part on the determination of a matching user, transmitting, to a user device, a notification associated with the matching user regarding the first application;
receiving, from the user device, a potential fraud indication indicating that the first application or the first electronic request is possibly fraudulent;
determining based at least in part on the potential fraud indication, that the first application or the first electronic request is fraudulent; and
generating and transmitting, to the tax authority, electronic instructions to stop processing the first application as requested by the first electronic request.

10. The non-transitory storage medium of claim 9, wherein the first user data further includes personally identifying information (PII) associated with the first user.

11. The non-transitory storage medium of claim 9, wherein the notification to the user device regarding a successful application filing of the first application is transmitted to a type of contact included in the verification data.

12. The non-transitory storage medium of claim 9, wherein the instructions further comprise:
transmitting, to an external third party entity, the electronic instructions to stop the processing of the first application.

13. The fraud detection and alert system of claim 1, wherein the alphanumeric identifier comprises all letters, all numbers, or a mix of letters and numbers.

14. The computerized method of claim 5, wherein the alphanumeric identifier comprises all letters, all numbers, or a mix of letters and numbers.

15. The non-transitory storage medium of claim 9, wherein the alphanumeric identifier comprises all letters, all numbers, or a mix of letters and numbers.

16. The fraud detection and alert system of claim 1, wherein the one or more physical processors are further configured by machine readable instructions to:
associate the alphanumeric identifier to the first verification data stored on the one or more data stores.

17. The computerized method of claim 5, further comprising:
associating the alphanumeric identifier to the first verification data stored on the one or more data stores.

18. The non-transitory storage medium of claim 9, wherein the instructions further comprise:
associating the alphanumeric identifier to the first verification data stored on the one or more data stores.

* * * * *